(12) United States Patent
Mims et al.

(10) Patent No.: US 8,574,443 B1
(45) Date of Patent: Nov. 5, 2013

(54) SYSTEM AND METHOD FOR GREASE CONTAINMENT WITH WATER DRAINING UTILITY

(75) Inventors: Shawn William Boland Mims, Raleigh, NC (US); Joseph R. Dunn, Raleigh, NC (US)

(73) Assignee: DunnWell, LLC, Durham, NC (US)

( * ) Notice: Subject to any disclaimer, the term of this patent is extended or adjusted under 35 U.S.C. 154(b) by 249 days.

(21) Appl. No.: 13/098,459

(22) Filed: Apr. 30, 2011

Related U.S. Application Data

(60) Provisional application No. 61/330,255, filed on Apr. 30, 2010.

(51) Int. Cl.
*B01D 35/02* (2006.01)
*F24C 15/20* (2006.01)

(52) U.S. Cl.
USPC .............. 210/802; 210/521; 55/DIG. 36

(58) Field of Classification Search
USPC ............. 210/800–802, 693, 513, 521; 55/DIG. 36; 126/299 R–299 D
See application file for complete search history.

(56) References Cited

U.S. PATENT DOCUMENTS

| | | | |
|---|---|---|---|
| D35,342 S | 11/1901 | Boeck | |
| 3,520,093 A | 7/1970 | Painter | |
| D233,604 S | 11/1974 | Weber et al. | |
| 4,113,617 A * | 9/1978 | Bereskin et al. | 210/742 |
| 4,635,617 A * | 1/1987 | Simonsen | 126/299 E |
| 4,869,236 A | 9/1989 | Blough | |
| 4,887,588 A * | 12/1989 | Rial | 126/299 R |
| 4,987,882 A * | 1/1991 | Kaufman | 126/299 D |
| 5,196,040 A * | 3/1993 | Malloy et al. | 55/323 |
| 5,318,607 A * | 6/1994 | Malloy et al. | 55/323 |
| 5,512,073 A * | 4/1996 | Mirza et al. | 55/323 |
| 5,540,744 A * | 7/1996 | Renna | 55/323 |
| 5,567,216 A * | 10/1996 | Mirza et al. | 55/323 |
| 5,814,115 A * | 9/1998 | Allen et al. | 55/350.1 |
| 5,869,236 A * | 2/1999 | Dupret et al. | 435/6.19 |
| 5,874,292 A * | 2/1999 | McMinn, Jr. | 435/262 |
| 6,010,558 A * | 1/2000 | Ackland | 95/141 |
| 6,143,047 A * | 11/2000 | Jodoin et al. | 55/323 |
| D452,906 S | 1/2002 | Peng | |
| 6,391,074 B1 * | 5/2002 | McCrary | 55/321 |

(Continued)

OTHER PUBLICATIONS

Co-pending U.S. Appl. No. 13/567,006, filed Aug. 3, 2012.

(Continued)

*Primary Examiner* — Frank Lawrence, Jr.
(74) *Attorney, Agent, or Firm* — Vincent K. Gustafson; Jenkins, Wilson, Taylor & Hunt, P.A.

(57) ABSTRACT

A drain connector may be arranged within a trough or sump of a grease containment apparatus to separate a water component from brown water, and automatically drain same when the brown water attains a predefined level, to prevent overflowing of brown water from the grease containment apparatus. A grease containment apparatus arranged to receive grease discharged by a fan-type rooftop grease exhauster may include multiple corner sections and at least one trough disposed between the sumps, and arranged on at least one (preferably all) sides of a rooftop grease exhauster. Mounting brackets with multiple bends may flexibly support a grease containment apparatus above a roof surface. Flashing is provided to direct grease into at least one trough section. A venturi cleaning attachment may be provided to promote forced suction discharge of a grease containment system motivated by ingress of pressurized fluid.

21 Claims, 22 Drawing Sheets

(56) References Cited

U.S. PATENT DOCUMENTS

| | | | |
|---|---|---|---|
| 6,468,323 B1* | 10/2002 | Chwala | 55/490 |
| 6,648,937 B1* | 11/2003 | Nguyen et al. | 55/421 |
| 6,676,723 B2* | 1/2004 | Chwala | 55/421 |
| 6,716,099 B2* | 4/2004 | Pfleiderer et al. | 454/41 |
| 6,814,769 B1* | 11/2004 | Stefanucci | 55/385.1 |
| 7,037,359 B1* | 5/2006 | McCauley | 95/141 |
| 7,244,283 B2 | 7/2007 | Mirza | |
| 7,244,293 B2* | 7/2007 | Morita et al. | 96/204 |
| 7,332,004 B2* | 2/2008 | Jackson | 55/350.1 |
| 7,395,633 B2* | 7/2008 | Baeta | 52/16 |
| 8,343,353 B1 | 1/2013 | Dunn et al. | |
| 2004/0040219 A1* | 3/2004 | Bacik et al. | 52/11 |
| 2009/0114094 A1* | 5/2009 | Clapp et al. | 95/148 |
| 2010/0199618 A1* | 8/2010 | Tomkiewicz | 55/421 |

OTHER PUBLICATIONS

Unknown, Photograph and description of grease containment system with single sump (pictured at lower center) attached to base of rooftop grease exhauster fan, Nov. 2008, p. 1.

Facilitec Coporation; "Rooftop Grease Containment Products" website webpage, accessible at http://www.facilitec-se.com/rooftop/how-it-works.aspx, accessed on Jun. 2, 2009.

Facilitec Corporation, "Rooftop Grease Containment Products—Installation and Maintenance" website webpage, accessible at http://www.facilitec-east.com/rooftop/installation-and-maintenance.aspx, accessed on Mar. 18, 2011.

* cited by examiner

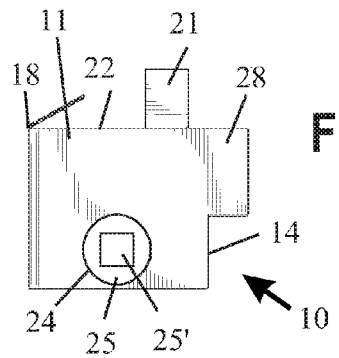
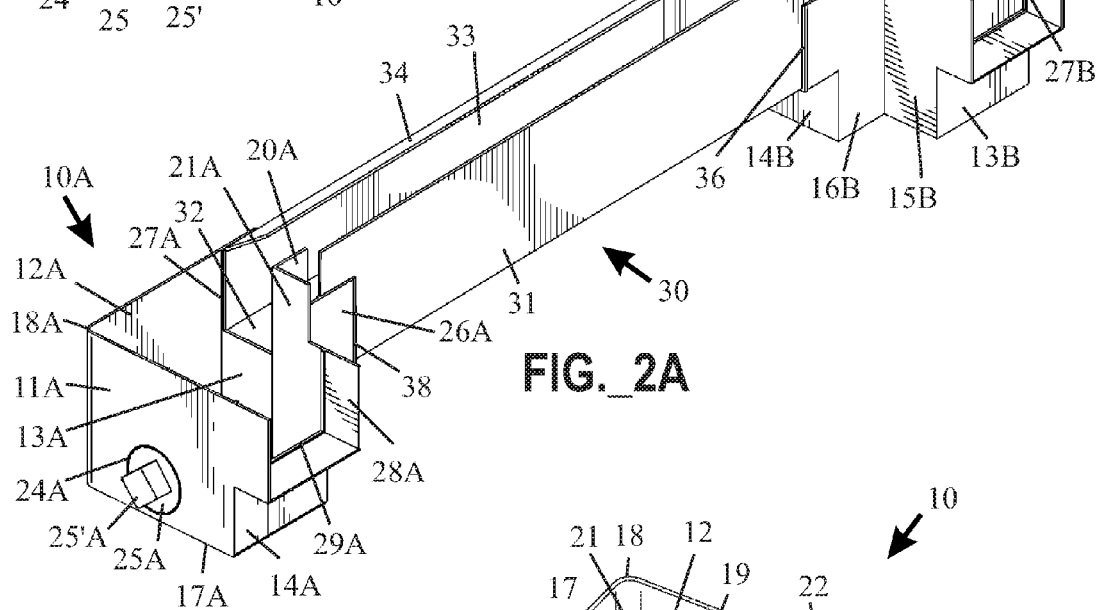
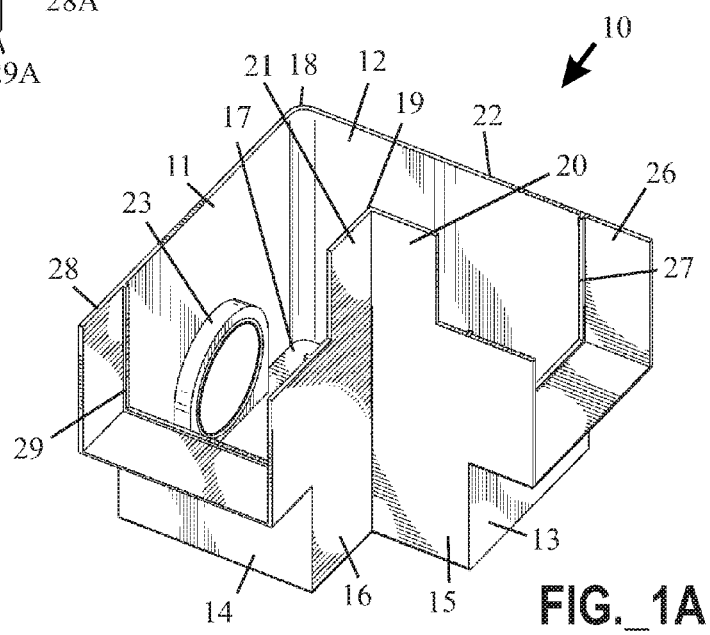

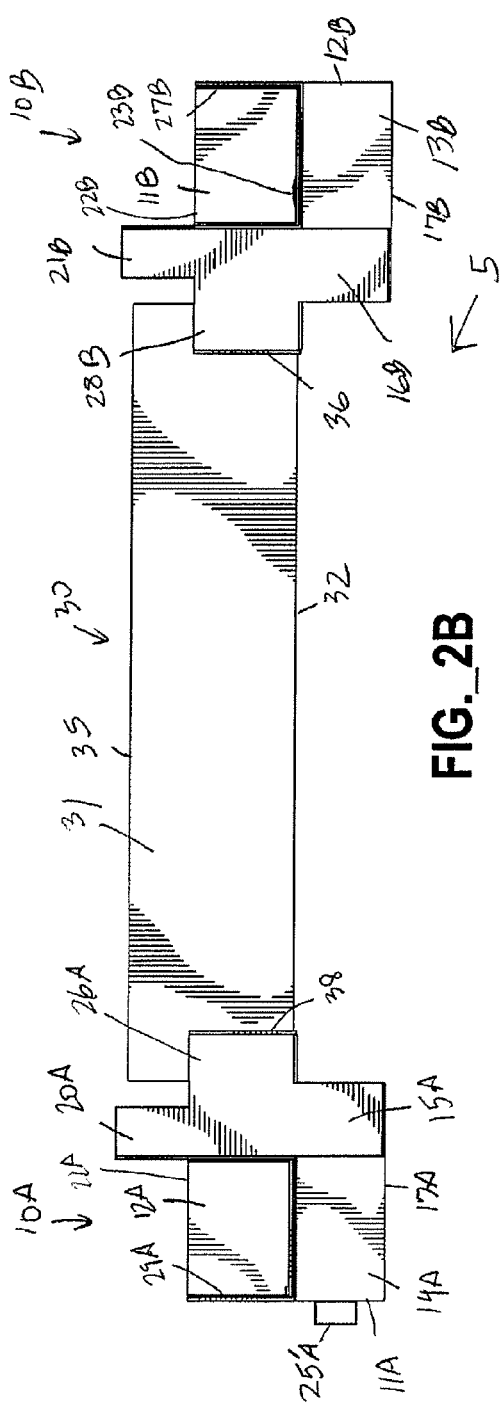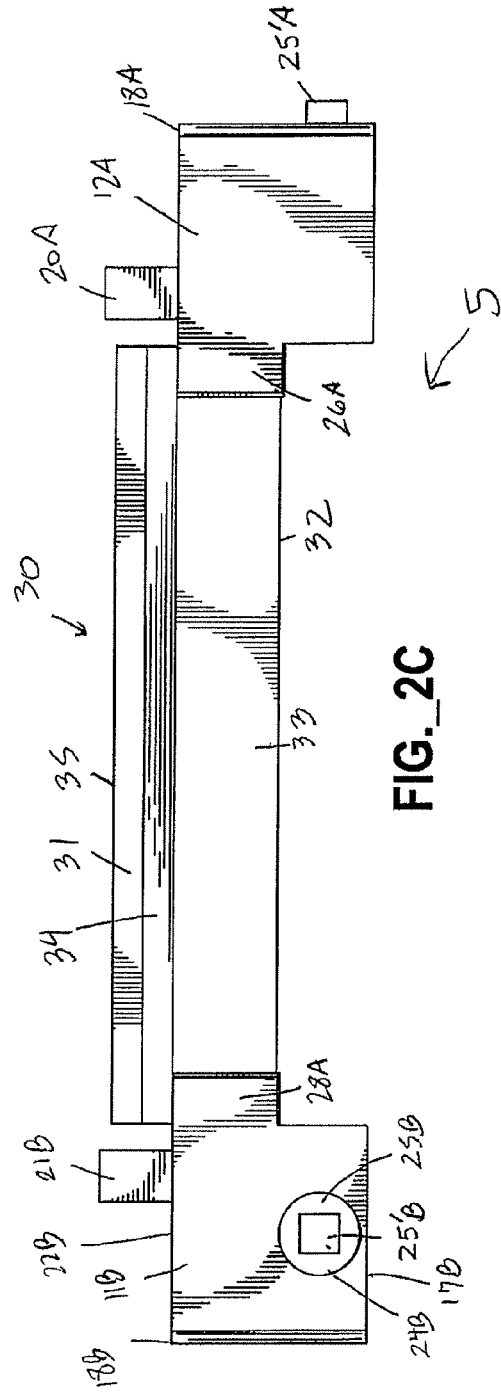

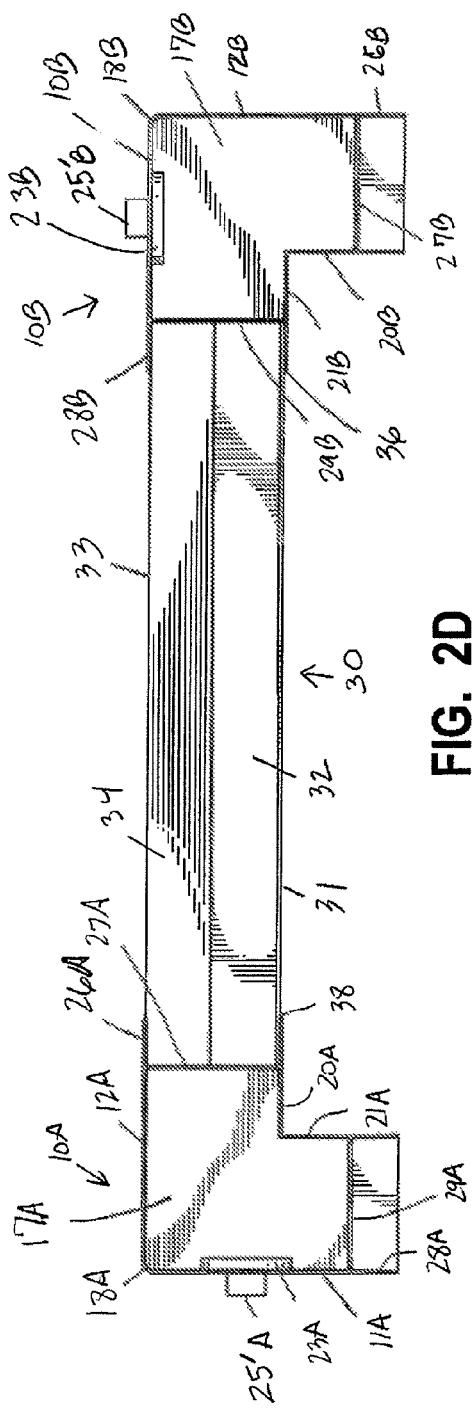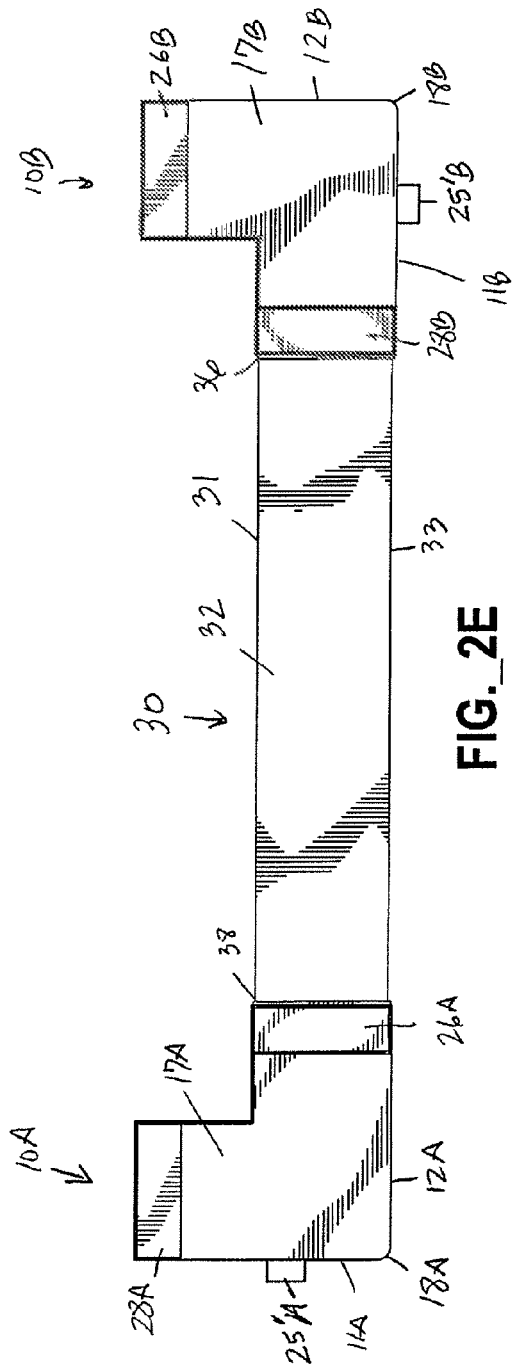

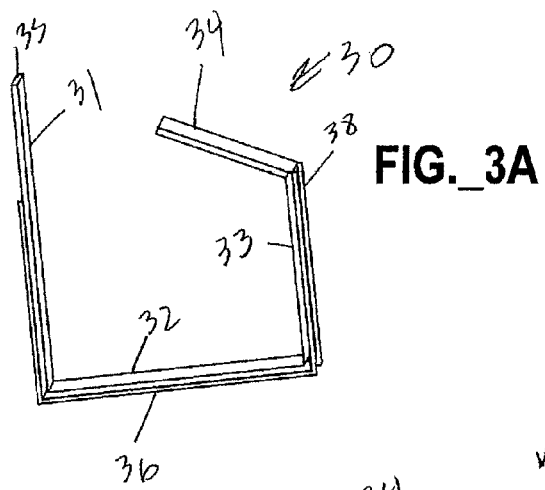
FIG. _3A
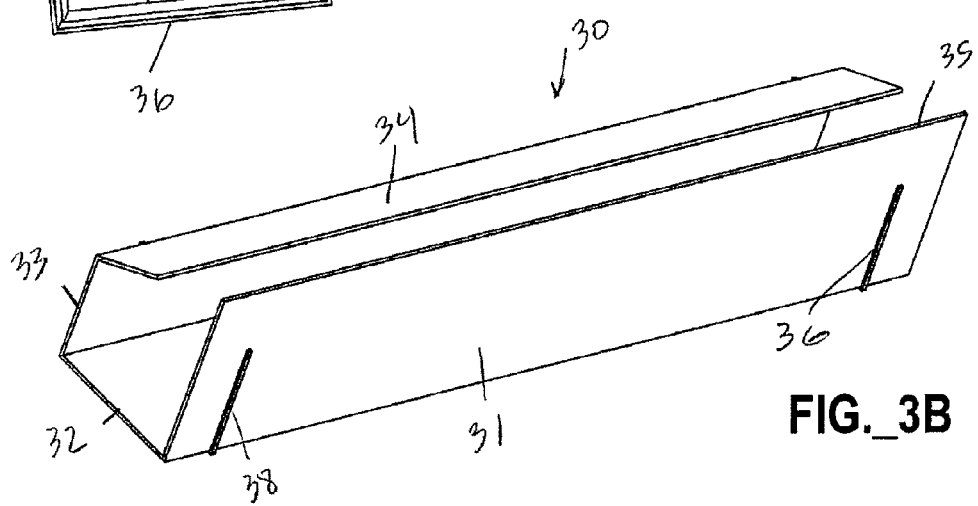
FIG. _3B
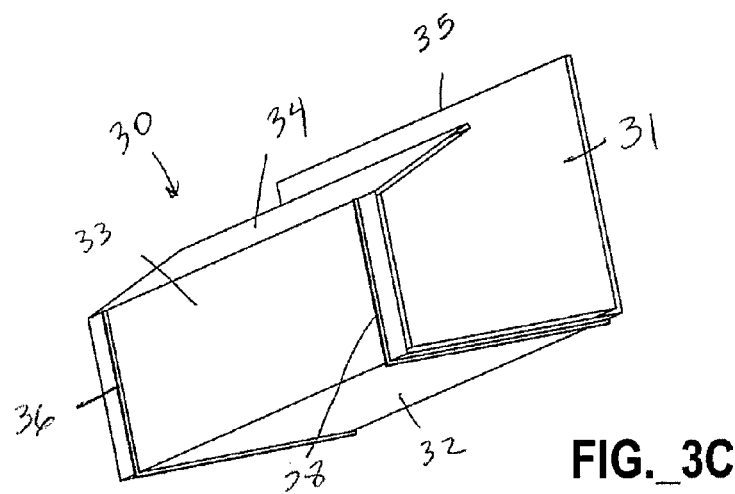
FIG. _3C

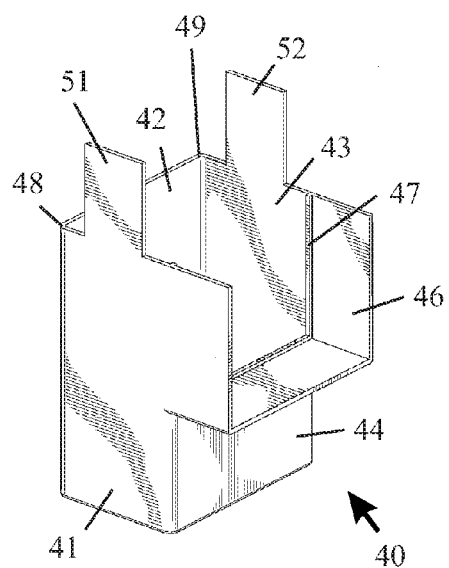
FIG._4A
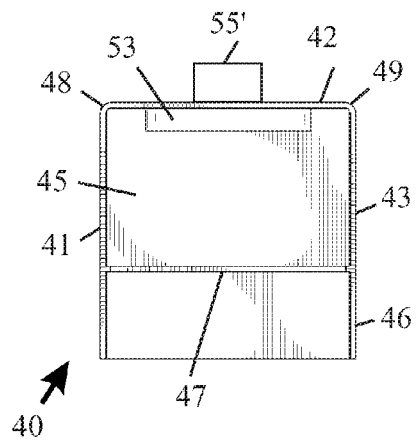
FIG._4B
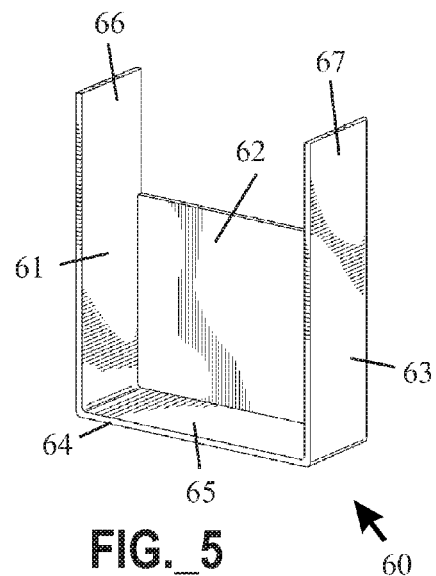
FIG._5
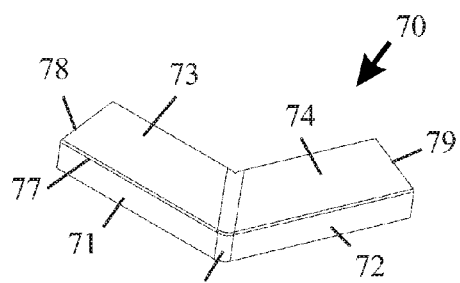
FIG._6A
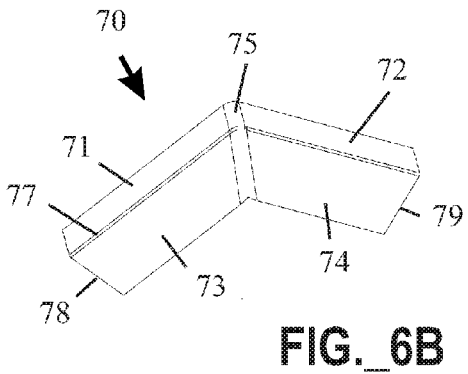
FIG._6B

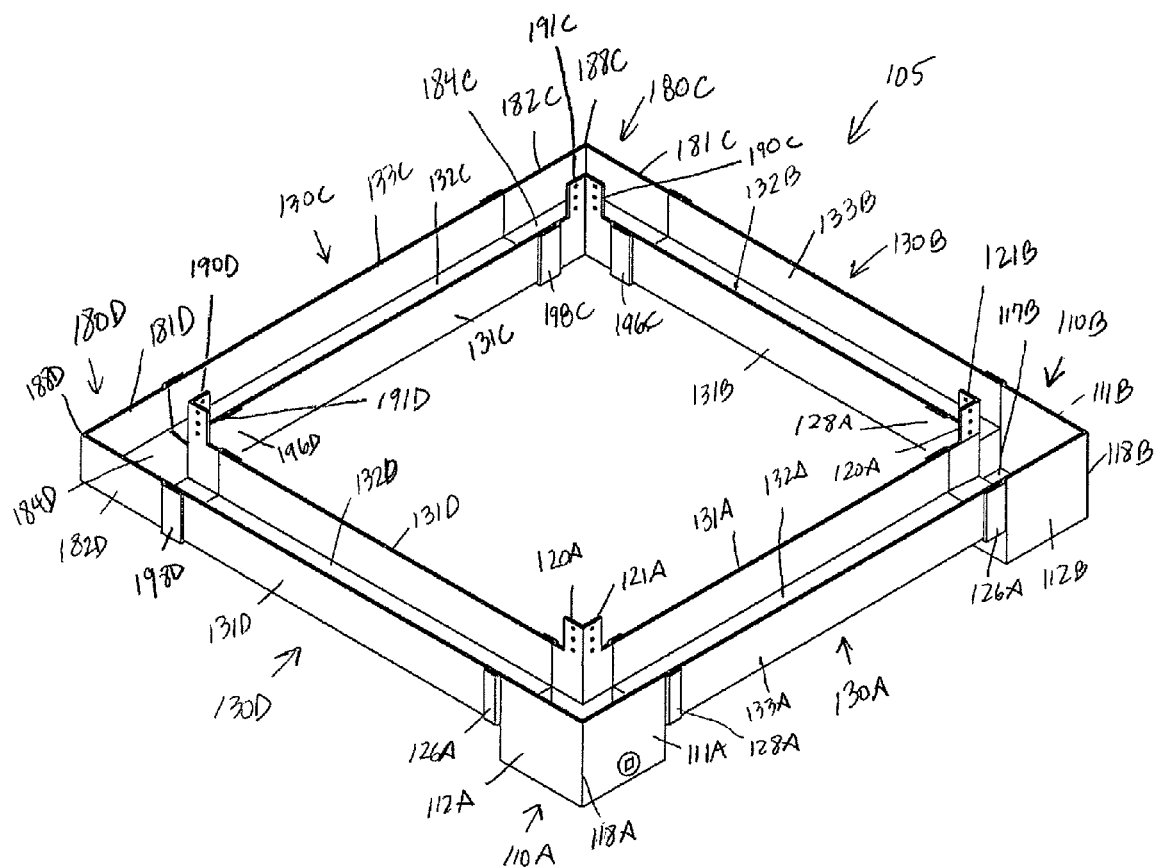
FIG._7

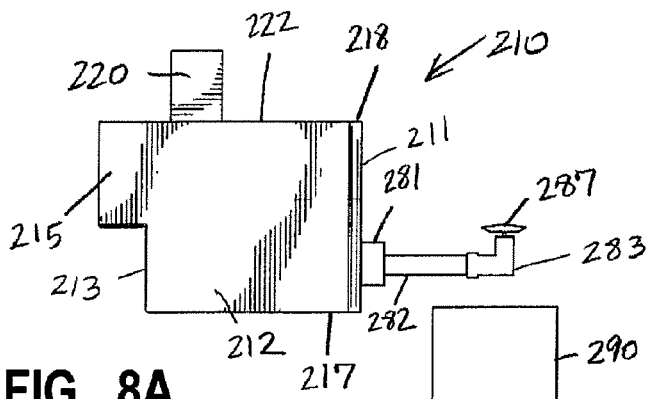
FIG. _8A
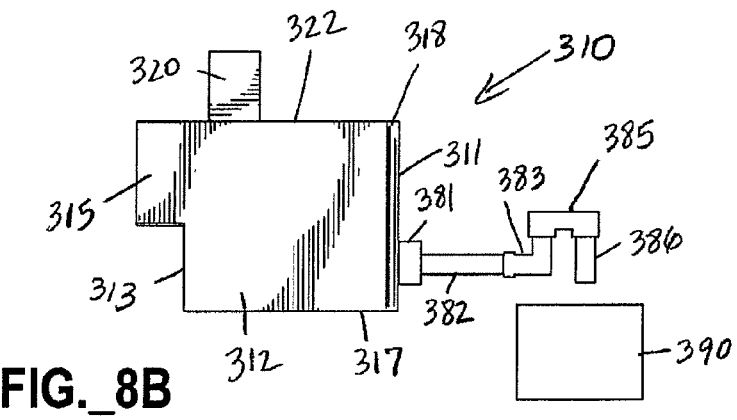
FIG. _8B
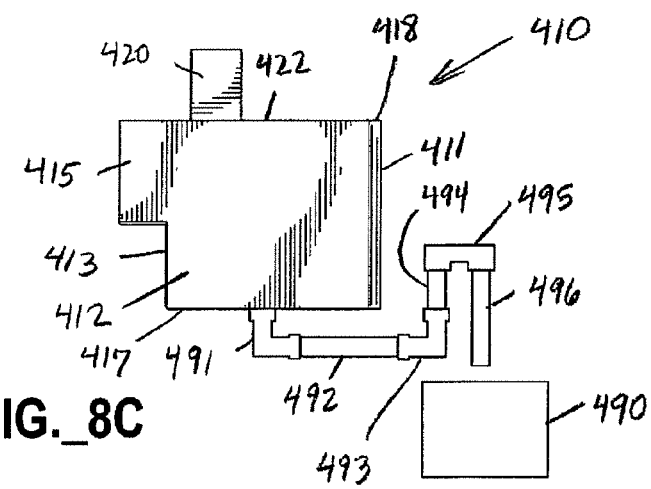
FIG. _8C

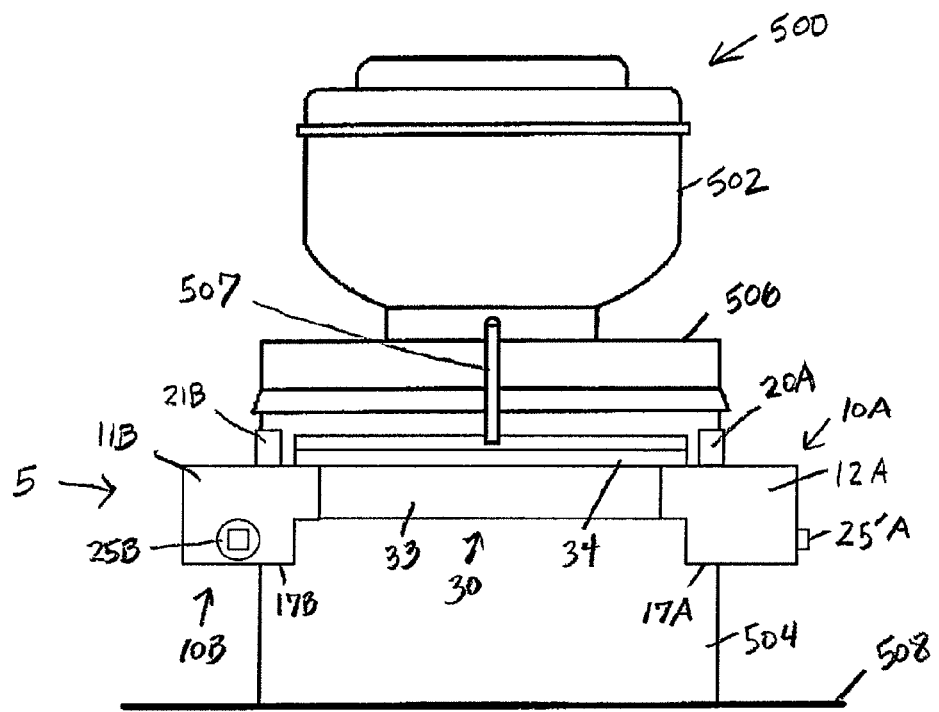
FIG._9
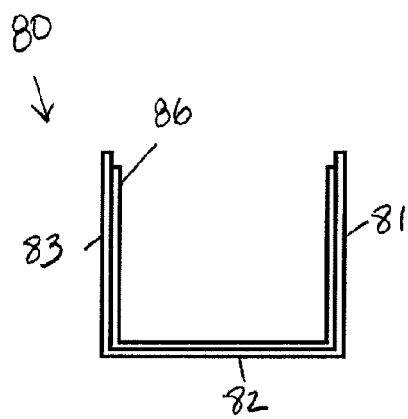
FIG._10A
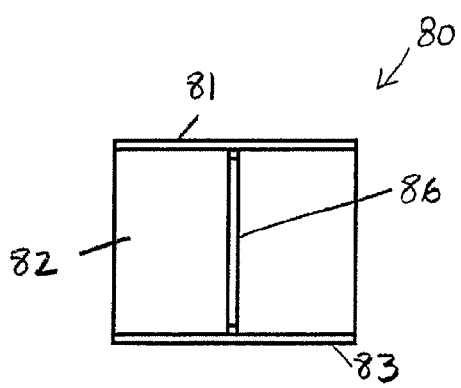
FIG._10B

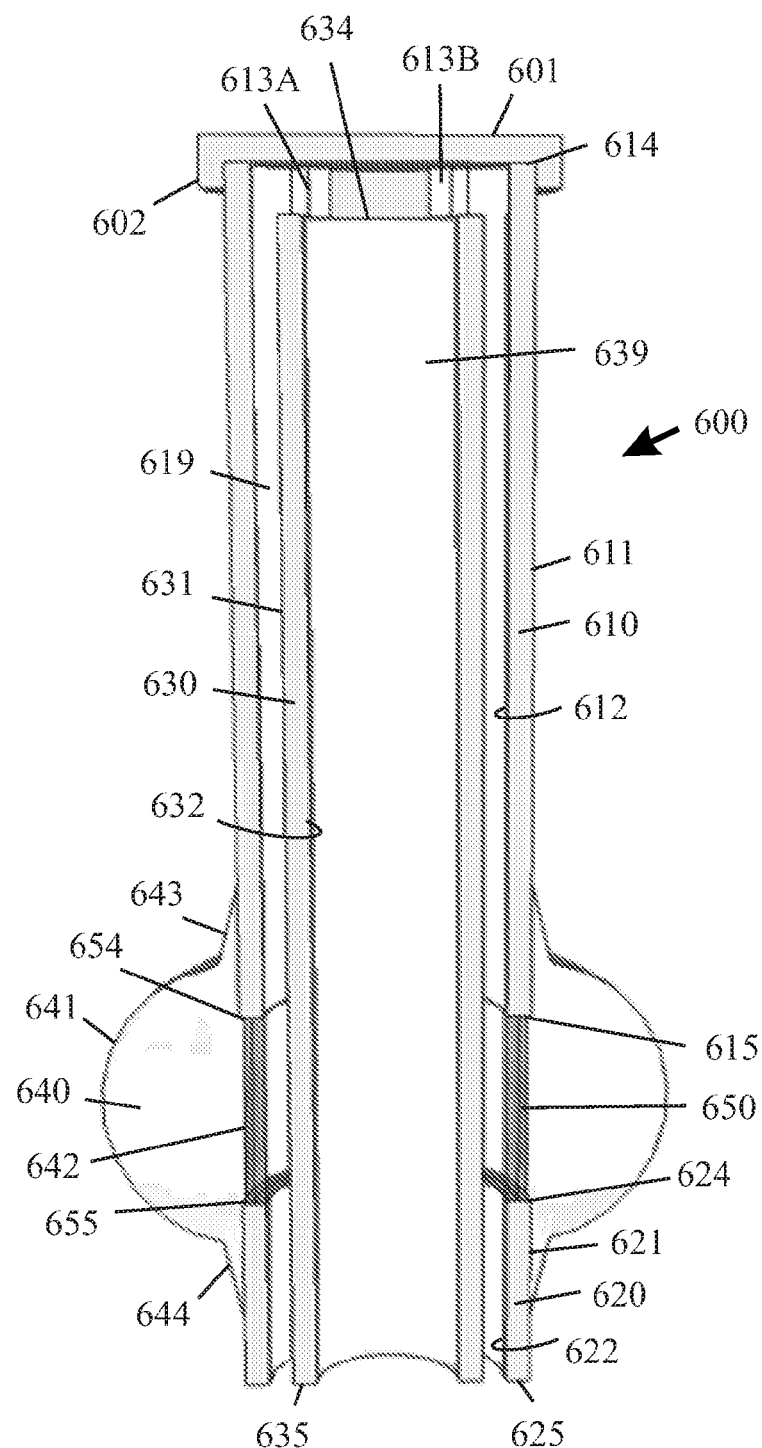
FIG._11A

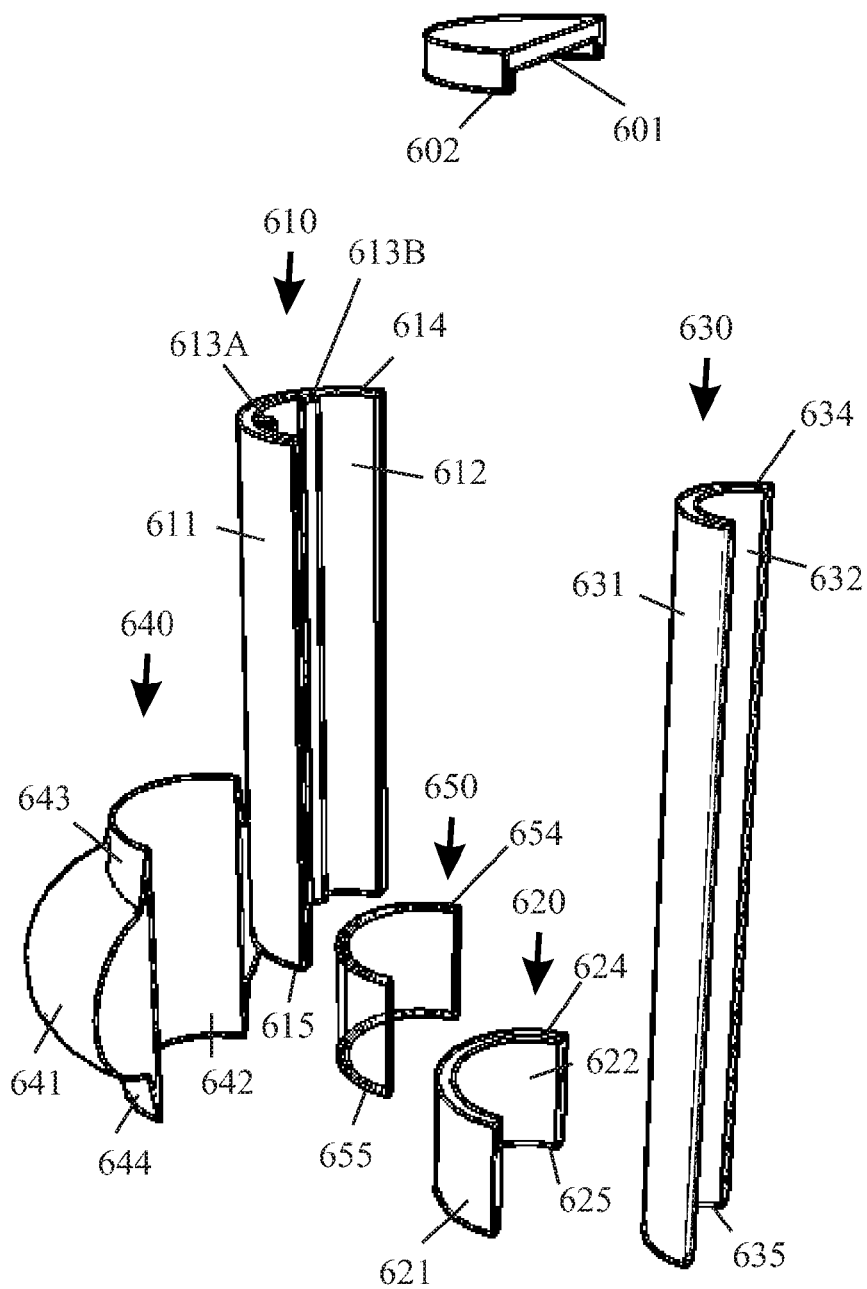
FIG._11B

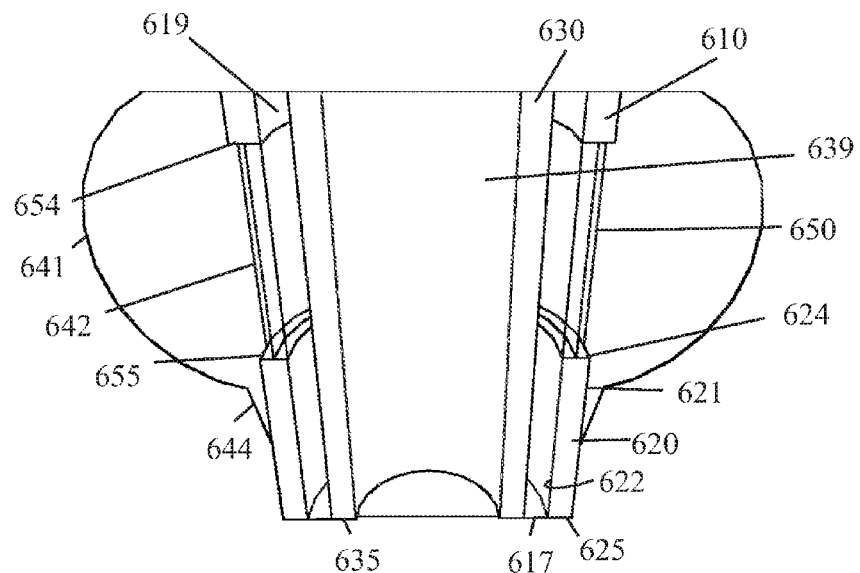
FIG._11C
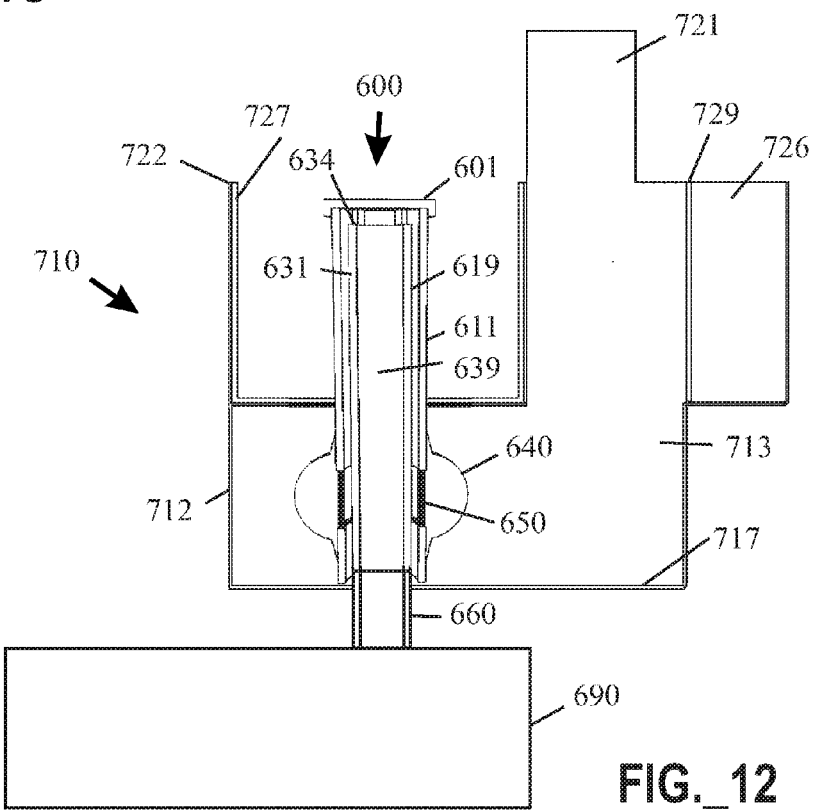
FIG._12

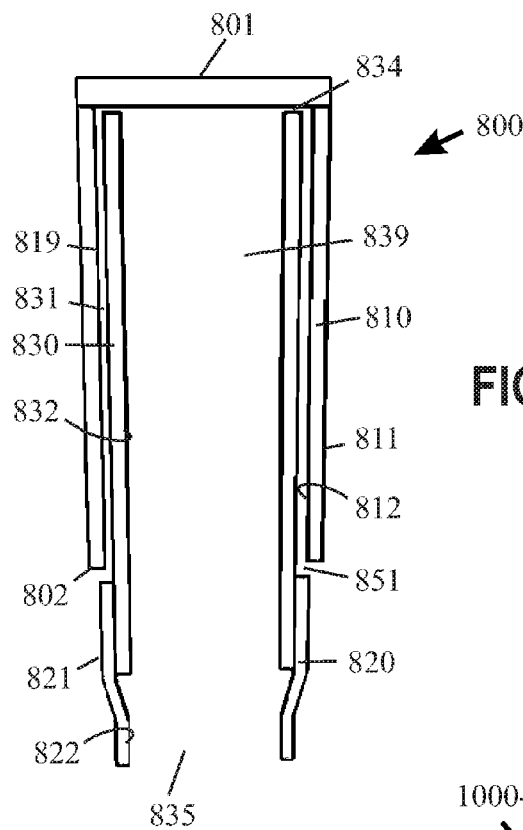
FIG._13
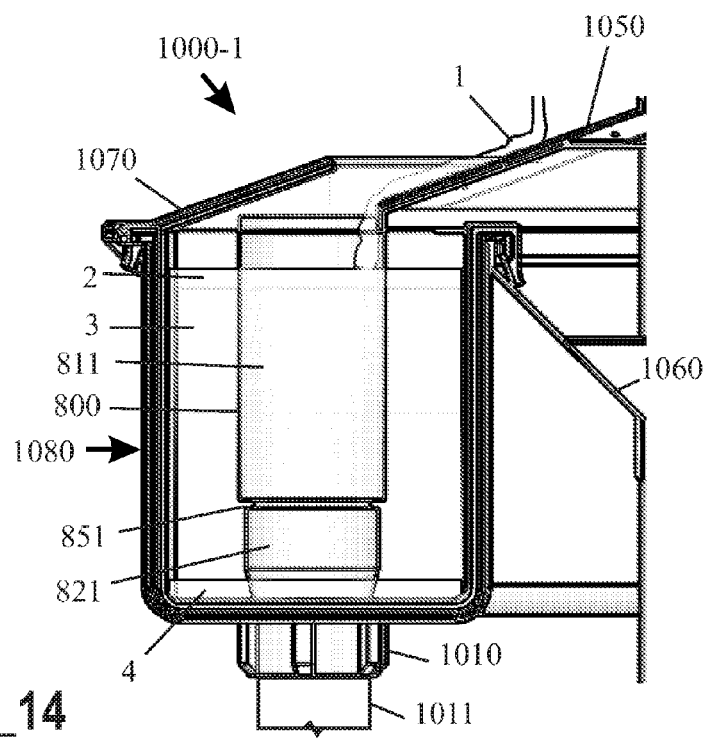
FIG._14

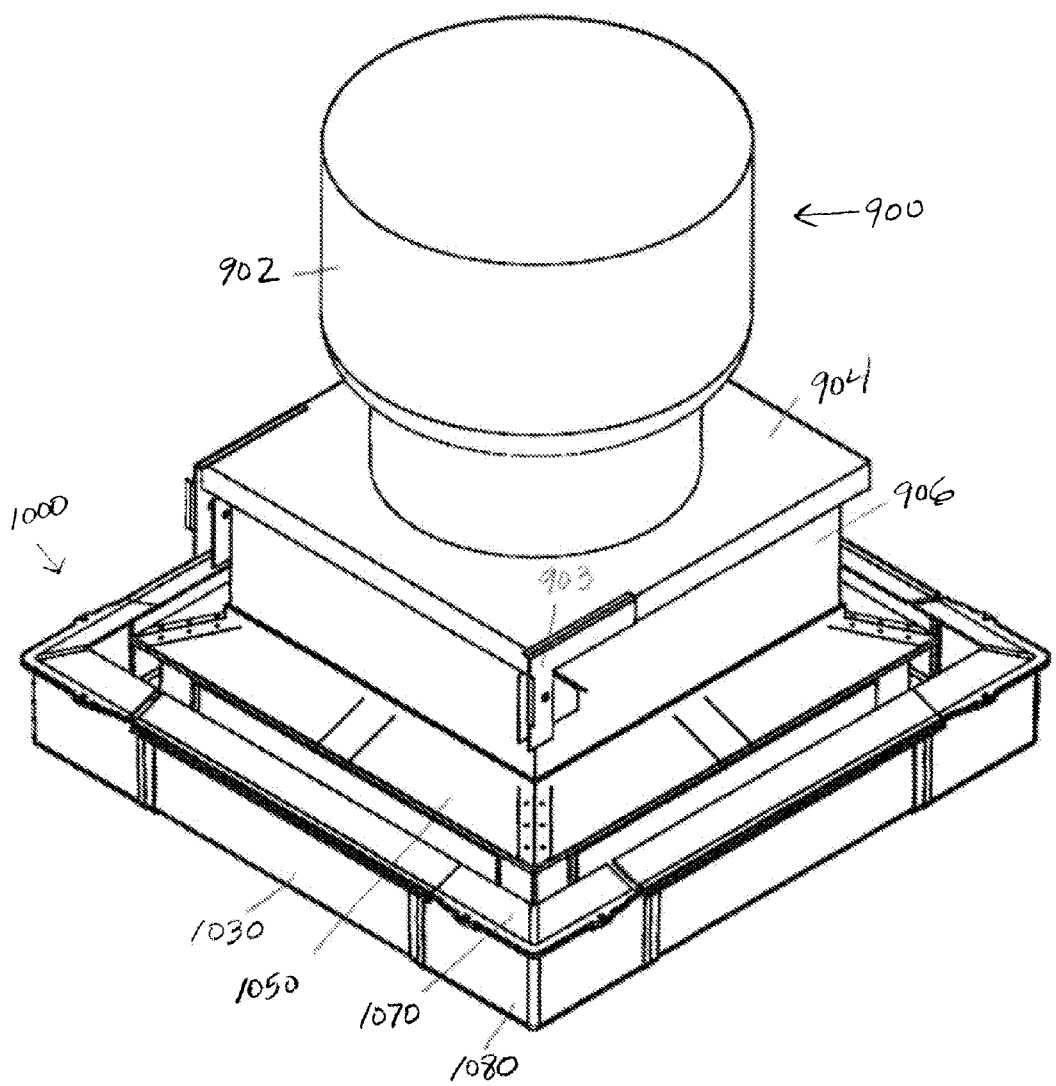
FIG._15A

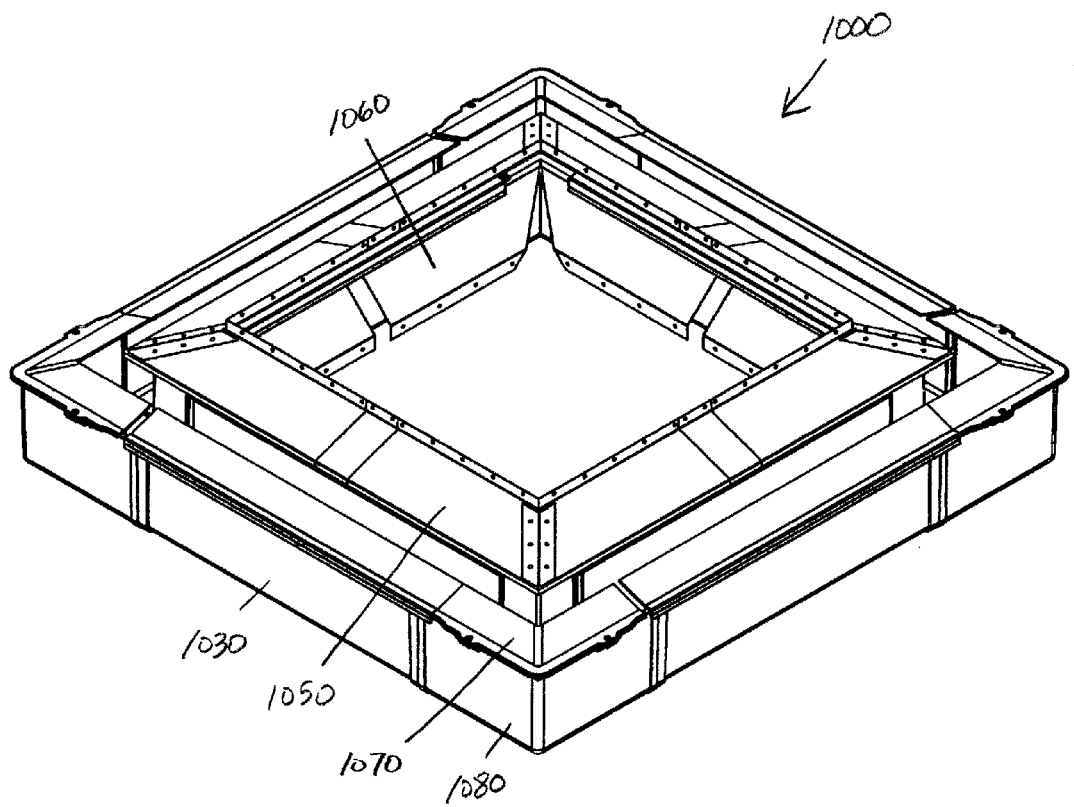
FIG._15B

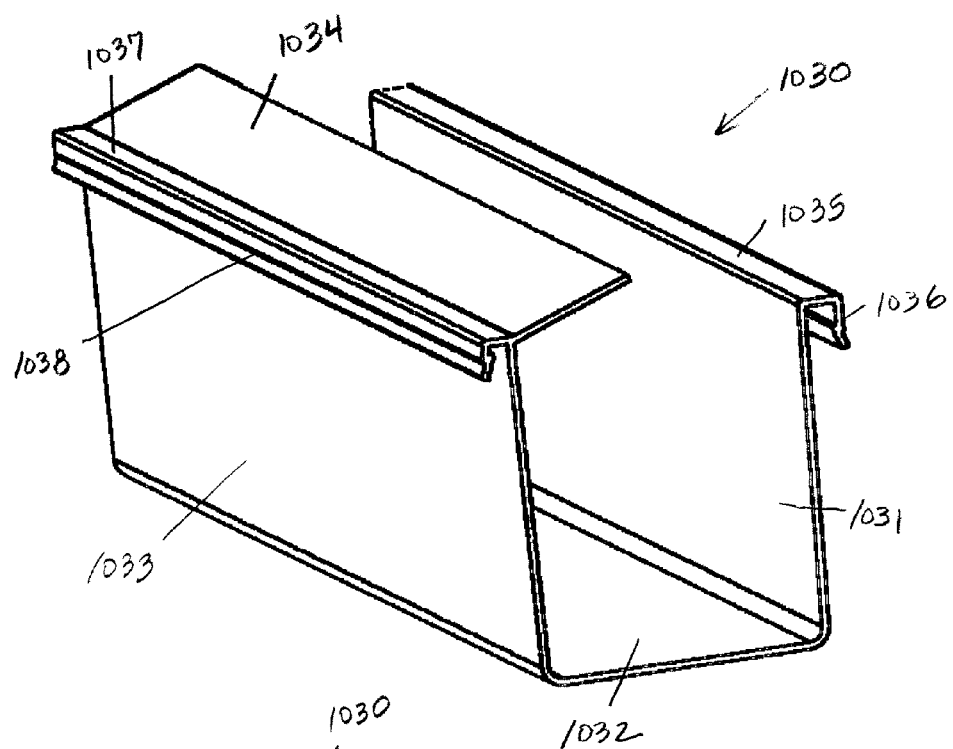
FIG. _16A
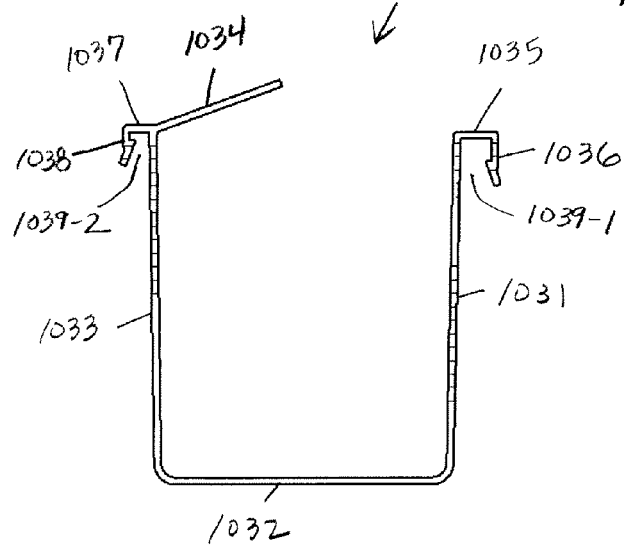
FIG. _16B

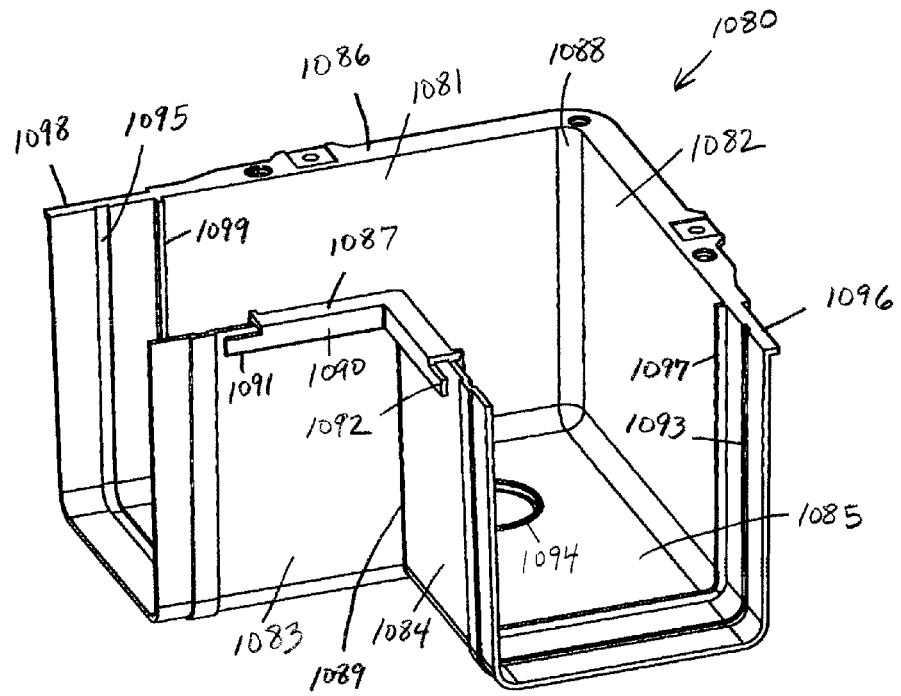
FIG._17A
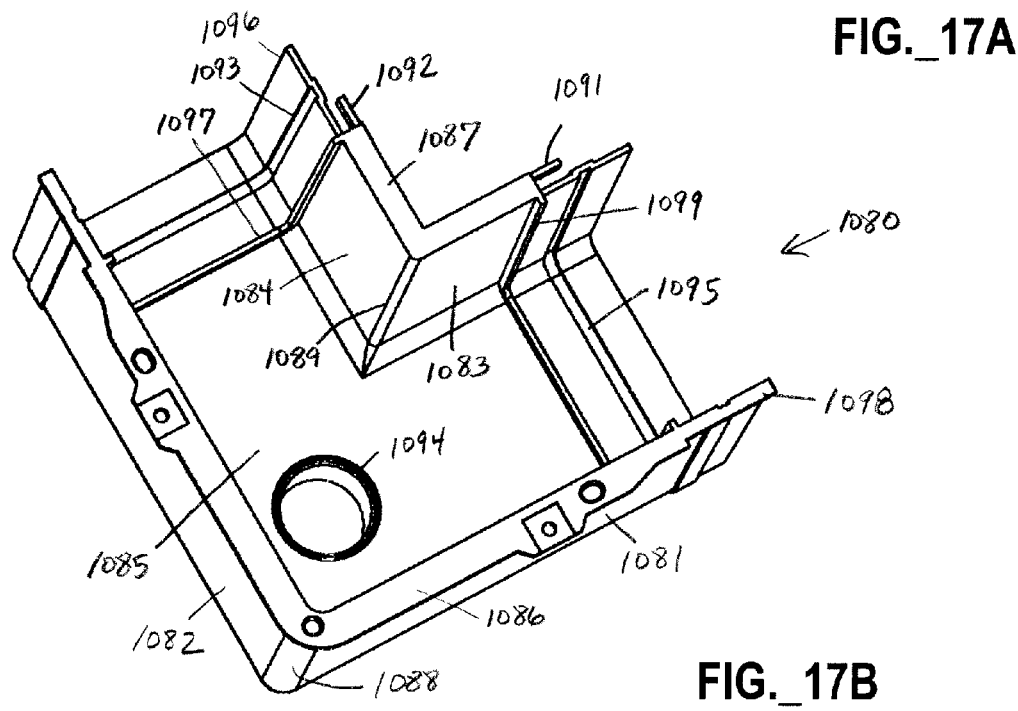
FIG._17B

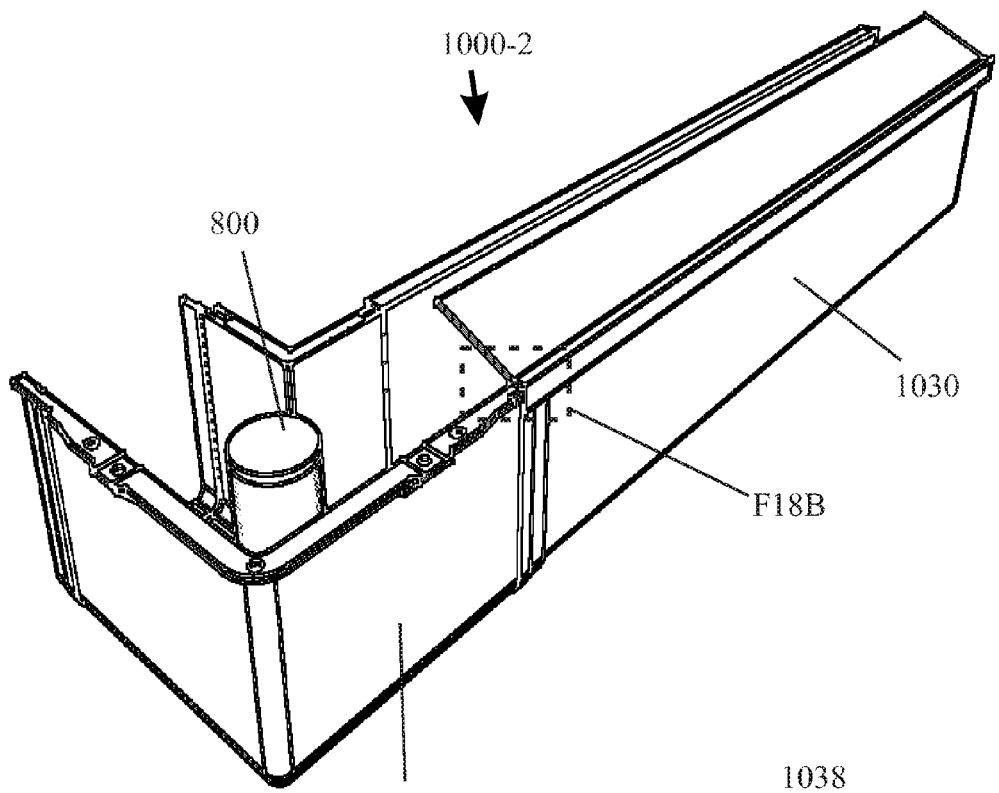
FIG._18A
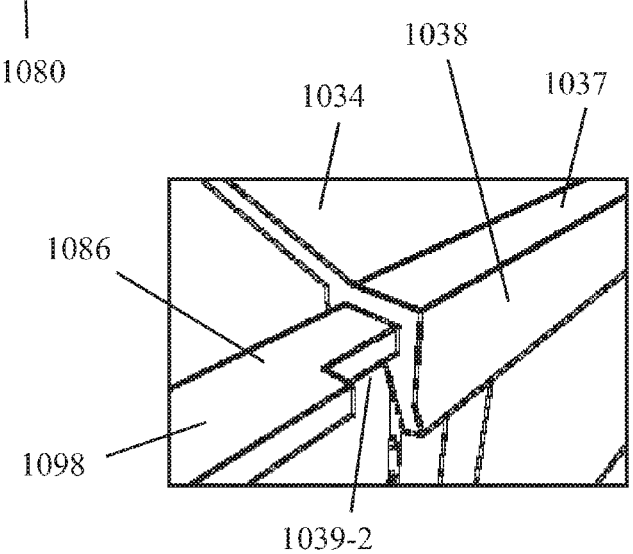
FIG._18B

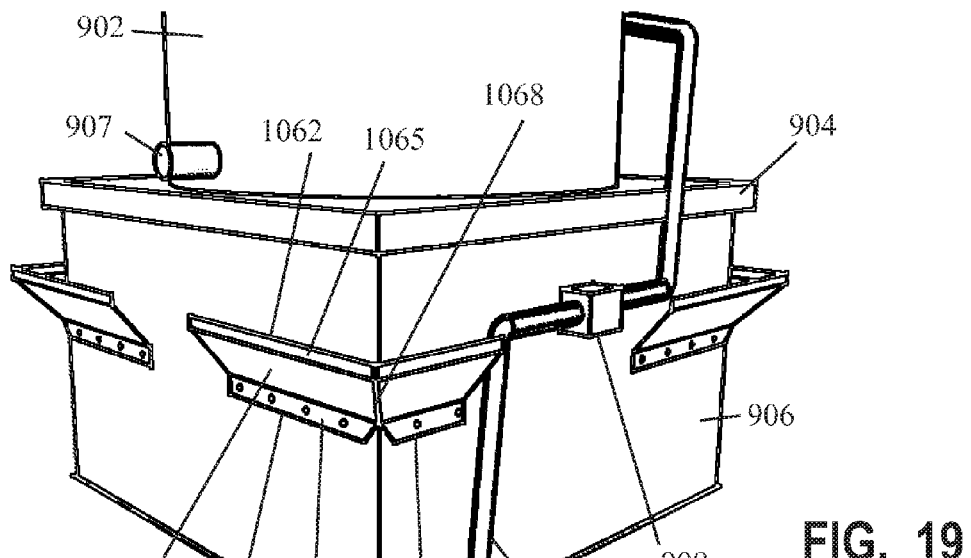
FIG._19
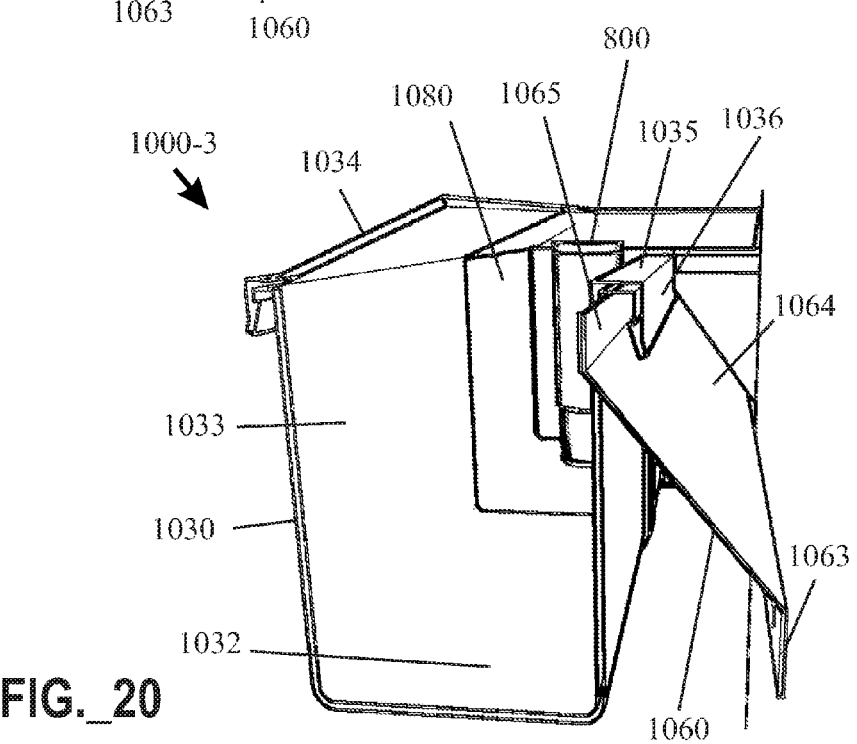
FIG._20

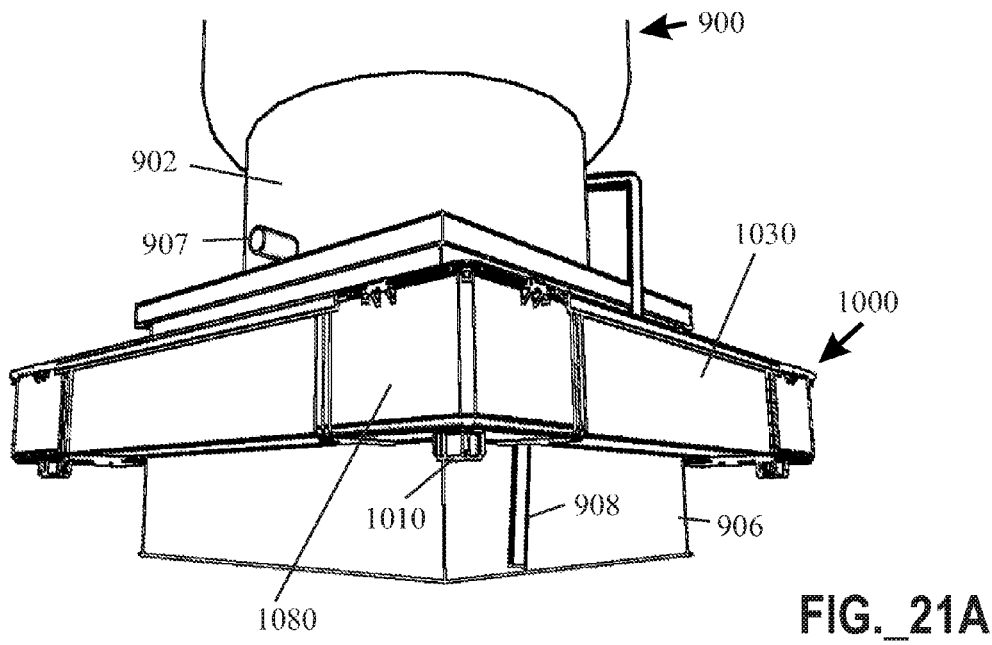
FIG._21A
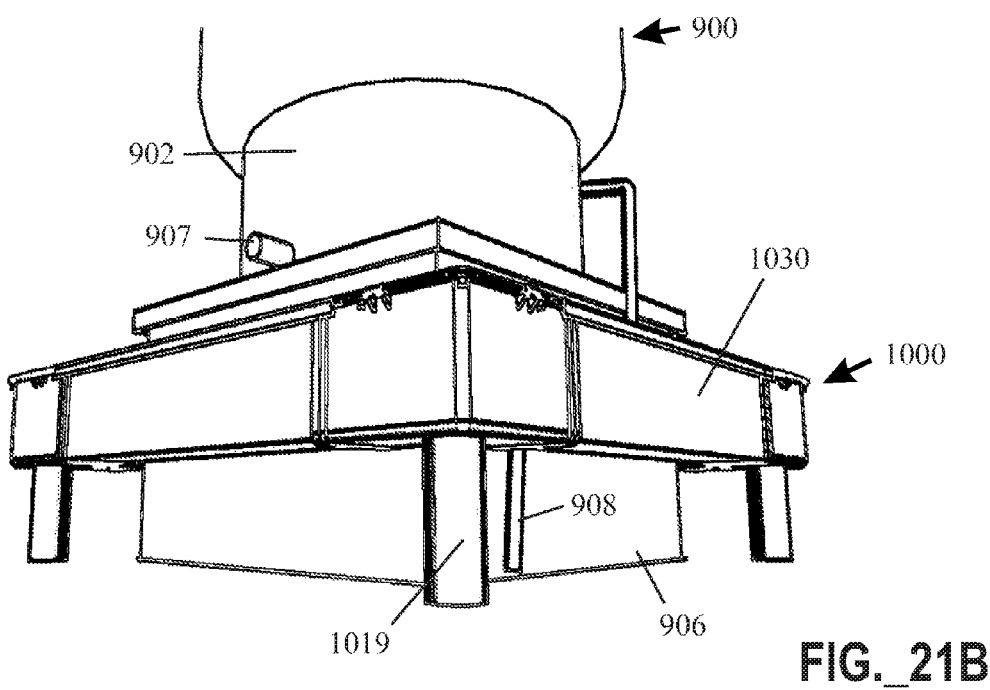
FIG._21B

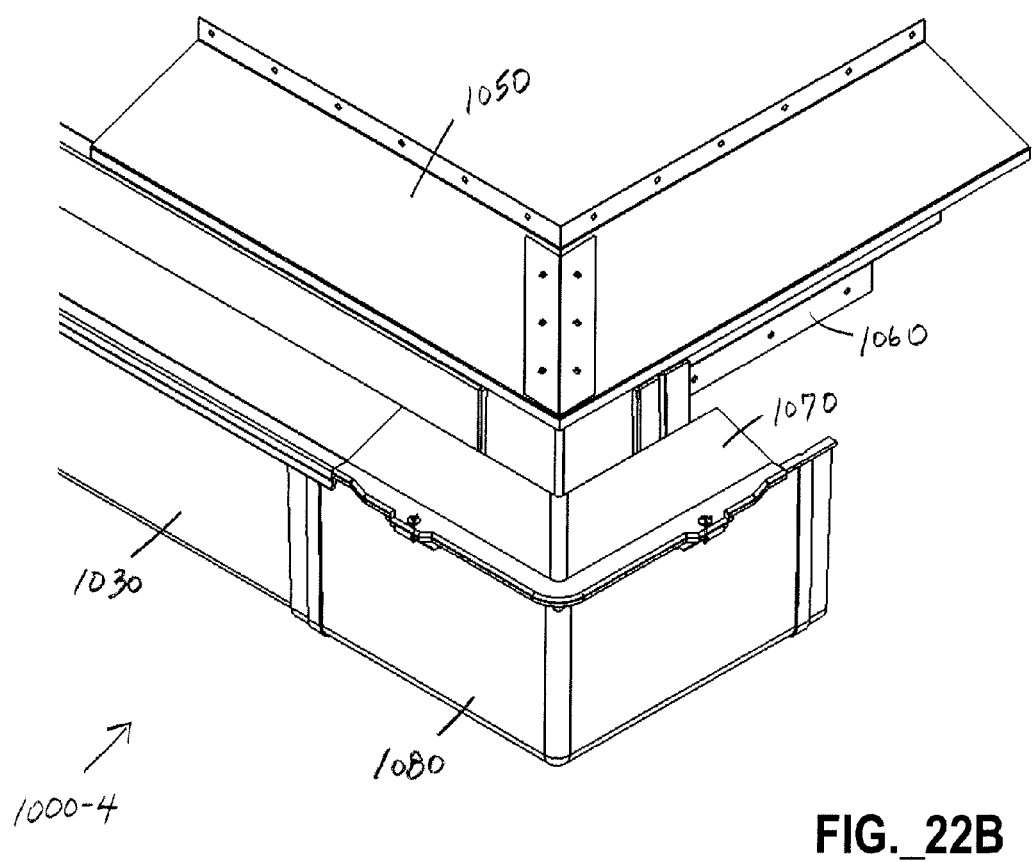
FIG._22B

SYSTEM AND METHOD FOR GREASE CONTAINMENT WITH WATER DRAINING UTILITY

STATEMENT OF RELATED APPLICATION(S)

This application claims benefit under 35 U.S.C. §120 of U.S. Provisional Patent Application No. 61/330,255 filed on Apr. 30, 2010.

TECHNICAL FIELD

The present invention relates generally to grease containment systems for containing grease discharged by fan-type rooftop grease exhausters, and related draining and cleaning apparatuses.

BACKGROUND

Restaurants generate high volumes of grease that are discharged via roof mounted exhaust systems. Discharged grease may accumulate on a rooftop and lead to deterioration, as well as pose an extreme fire hazard.

Various systems have been developed to contain grease discharged via roof mounted exhaust systems; however, such systems suffer from limitations that restrict their utility.

Many conventional grease containment assemblies use filters, absorbents, and/or grease separating media disposed within a receptacle such as a duct or basin arrange to receive grease discharged (e.g., via a pipe or spout) from a roof-mounted grease exhauster. In systems utilizing grease separating and/or absorbent media, such media must be periodically changed to avoid release of grease onto a rooftop. Rooftop environments are subject to unpredictable amounts of rainfall, and incident rain may contact grease discharged by a rooftop grease exhauster. When rooftop environments are exposed to significant rainfall, a duct or basin containing grease separating media may overflow, causing grease to saturate the rooftop and pose a fire hazard. It would be desirable to minimize possibility of uncontrolled discharge of grease (e.g., overflow) from a grease containment system.

Although roof-mounted grease exhausters are intended to discharge liquid grease via a pipe or spout, in practice, significant amounts of liquid grease may also leak onto a pedestal to which a grease exhauster is mounted, and then flow from the pedestal to a rooftop (e.g., roofing) surface. It would be desirable to catch grease discharged onto a grease exhauster pedestal and prevent such grease from contacting a rooftop surface.

It can be burdensome for personnel to frequently access restaurant rooftops to check saturation status of grease separating and/or absorbent media, and such media can be expensive to change. It would be desirable to reduce the frequency with which grease containment assemblies must be accessed. It would also be desirable to minimize or eliminate the need for grease separating and/or absorbent media.

Rooftop grease exhausters are provided in numerous configurations and are installed in highly variable conditions, such as in relation to roof pitch, and in proximity to building structural elements and other rooftop-mounted mechanical equipment. It would be desirable to provide grease containment assemblies capable of accommodating highly variable rooftop grease exhauster installation conditions, without requiring shop fabrication of site-specific custom pieces (e.g., via sheet metal), and without requiring highly skilled labor to install grease containment assemblies.

Rooftop grease containment systems may be difficult to clean. It would be desirable to facilitate cleaning of rooftop grease containment systems in a simple, rapid, and effective manner.

A need therefore exist for improved grease containment systems and methods for use with rooftop mounted grease exhausters.

SUMMARY

Certain aspects of the present invention relates to grease containment systems and methods adapted to receive grease from (e.g., fan-type) rooftop grease exhausters, and to gravimetrically separate grease and water to permit water removal by evaporation and/or draining, preferably without requiring use of grease absorbent material. Further aspects relate to structures and methods to promote cleaning of grease containment systems.

One aspect of the present invention relates to a grease containment apparatus arranged to receive grease from a rooftop grease exhauster, the grease containment apparatus comprising: at least one trough section arranged to receive grease released from the rooftop grease exhauster; and a drain assembly arranged to drain fluid from the at least one trough section, the drain assembly comprising (a) an inner conduit disposed within an outer conduit, the outer conduit including an inlet opening, and the inner conduit including an inlet opening and an outlet opening, wherein the inlet opening of the inner conduit is disposed above the inlet opening of the outer conduit, and is further disposed below the upper end of the outer conduit; (b) a first flow passage extending between the inlet opening of the outer conduit and the inlet opening of the inner conduit; and (c) a second flow passage extending between the inlet opening of the inner conduit and the outlet opening of the inner conduit. Such apparatus may be used to automatically and preferentially drain water in comparison to grease from the grease containment apparatus.

Another aspect of the present invention relates to a grease containment apparatus arranged to receive grease from a rooftop grease exhauster, the grease containment apparatus comprising: a plurality of trough sections including multiple corner trough sections and at least one trough or runner section intermediately arranged and sealingly engaged between the multiple corner trough sections, wherein the plurality of trough sections comprise polymeric materials; a plurality of hangers joined to the rooftop grease exhauster or a support structure thereof, and arranged to support the plurality of trough sections in an elevated position relative to a roof surface, wherein each hanger comprises multiple bends to impart flexibility in supporting the plurality of trough sections; and flashing extending over or across the plurality of hangers or mounting brackets and arranged to direct grease received from the rooftop grease exhauster into the at least one trough section.

Yet another aspect of the present invention relates to a grease containment apparatus arranged to receive grease from a rooftop grease exhauster, the grease containment apparatus comprising: at least one trough section arranged to receive grease released from the rooftop grease exhauster; and a venturi cleaning attachment arranged to receive pressurized fluid and promote transfer of material from the at least one trough section into a material removal conduit.

In another separate aspect, any of the foregoing aspects, or other features described herein, may be combined for additional advantage.

Other aspects, features and embodiments of the invention will be more fully apparent from the ensuing disclosure and appended claims.

BRIEF DESCRIPTION OF THE DRAWINGS

FIG. 1A is perspective view of a corner sump assembly constituting part of a grease containment apparatus according to one embodiment of the present invention.

FIG. 1B is a front elevation view of the corner sump assembly of FIG. 1A.

FIG. 2A is a perspective view of at least a portion of a grease containment apparatus including one trough or runner connected to two corner sump assemblies according to another embodiment of the present invention.

FIG. 2B is a rear elevation view of the portion of the grease containment apparatus of FIG. 2A.

FIG. 2C is a front elevation view of the portion of the grease containment apparatus of FIGS. 2A-2B.

FIG. 2D is a top plan view of the portion of the grease containment apparatus of FIGS. 2A-2C.

FIG. 2E is a bottom plan view of the portion of the grease containment apparatus of FIGS. 2A-2D.

FIG. 3A is a side perspective view of a trough or runner section constituting part of a grease containment apparatus according to certain embodiments of the present invention.

FIG. 3B is an upper rear perspective view of the trough or runner section of FIG. 3A.

FIG. 3C is a lower front perspective view of the trough or runner section of FIGS. 3A-3B.

FIG. 4A is an upper perspective view of an end sump constituting part of a grease containment apparatus according to one embodiment of the present invention.

FIG. 4B is a top plan view of the end sump of FIG. 4A.

FIG. 5 is an upper perspective view of an end cap constituting part of a grease containment apparatus according to one embodiment of the present invention.

FIG. 6A is an upper perspective view of a corner rain shield constituting part of a grease containment apparatus according to one embodiment of the present invention.

FIG. 6B is a lower perspective view of the corner rain shield of FIG. 6A.

FIG. 7 is an upper perspective view of a grease containment apparatus including four troughs, two corner sump assemblies, and two corner troughs according to one embodiment of the present invention.

FIG. 8A is a side elevation view of a corner sump assembly having a side outlet connected to a first drain conduit having a top outlet arranged over a catch basin.

FIG. 8B is a side elevation view of a corner sump assembly having a side outlet connected to a second drain conduit having a bottom outlet arranged over a catch basin.

FIG. 8C is a side elevation view of a corner sump assembly having a bottom outlet connected to a third drain conduit having a bottom outlet arranged over a catch basin.

FIG. 9 is a side elevation view of a rooftop grease exhauster having mounted thereon a multi-sump grease containment apparatus according to one embodiment of the present invention, with a grease drain pipe arranged to conduct grease from the exhauster into a trough of the grease containment apparatus.

FIG. 10A is a side elevation view of a trough connector including an internal raised ridge portion, the trough connector being adapted for connection of two trough sections.

FIG. 10B is a top plan view of the trough connector of FIG. 10A.

FIG. 11A is a side cross-sectional view of a first drain assembly suitable for use with a grease containment apparatus, the drain assembly including a capped outer conduit, an inner conduit disposed within the outer conduit, a liquid inlet arranged above a bottom of the drain assembly, and each of a grease absorbing medium and a filtration screen arranged for flow of liquid therethrough and disposed upstream of or along an inlet opening of the outer conduit.

FIG. 11B is a perspective cross-sectional assembly view of components of the drain assembly of FIG. 11A.

FIG. 11C is a perspective cross-sectional view of a portion of the drain assembly of FIGS. 11A-11B.

FIG. 12 is an elevation cross-sectional view of the drain assembly of FIGS. 11A-11B operatively connected to a corner sump assembly having a bottom outlet arranged to drain liquid to a catch basin.

FIG. 13 is a side cross-sectional view of a second drain assembly suitable for use with a grease containment apparatus, the drain assembly including a capped (or otherwise closed) outer conduit, an inner conduit disposed within the outer conduit, and a liquid inlet passage arranged above a bottom of the drain assembly.

FIG. 14 is a side cutaway view of a portion of a grease containment apparatus according to another embodiment including a drain assembly according to FIG. 13 (illustrated in side elevation view mounted therein, with an associated drain pipe connected to the drain assembly, and showing a transit path for ingress of grease into the grease containment apparatus.

FIG. 15A is a perspective view of a grease containment apparatus according to one embodiment of the present invention, mounted to a rooftop grease exhauster.

FIG. 15B is a perspective view of the grease containment apparatus of FIG. 15A, without depiction of the rooftop grease exhauster.

FIG. 16A is a perspective view of a straight trough or runner section of the grease containment apparatus illustrated in FIGS. 15A-15B.

FIG. 16B is an end elevation view of the trough or runner section of FIG. 16A.

FIG. 17A is a first perspective view of a corner trough section of the grease containment apparatus illustrated in FIGS. 15A-15B.

FIG. 17B is a second perspective view of a corner trough section of the grease containment apparatus illustrated in FIGS. 15A-15B.

FIG. 18A is a perspective view of a portion of the grease containment apparatus of FIGS. 15A-15B, including a single straight trough or runner section mated with a corner trough section containing a drain assembly.

FIG. 18B is a magnified view of a portion of FIG. 18A, showing interconnection between the straight trough or runner section and the corner trough section along an upper peripheral edge thereof.

FIG. 19 is a perspective view of mounting bracket portions of the grease containment apparatus of FIGS. 15A-15B mounted to a pedestal base of a rooftop grease exhauster.

FIG. 20 is a perspective cutaway view of a portion of a grease containment apparatus according to FIGS. 15A-15B, showing a single straight trough or runner section suspended by a mounting bracket and connected to a corner trough assembly containing a drain assembly.

FIG. 21A is a lower perspective view of the grease containment apparatus and rooftop grease exhauster as illustrated in FIG. 15.

FIG. 21B is a lower perspective view of the grease containment apparatus and rooftop grease exhauster of FIG. 21A, further including optional support legs.

FIG. 22B is a perspective view of the portion of the grease containment apparatus portion illustrated in FIG. 22A, showing the illustrated components in an assembled state.

DETAILED DESCRIPTION

Figure 22A:
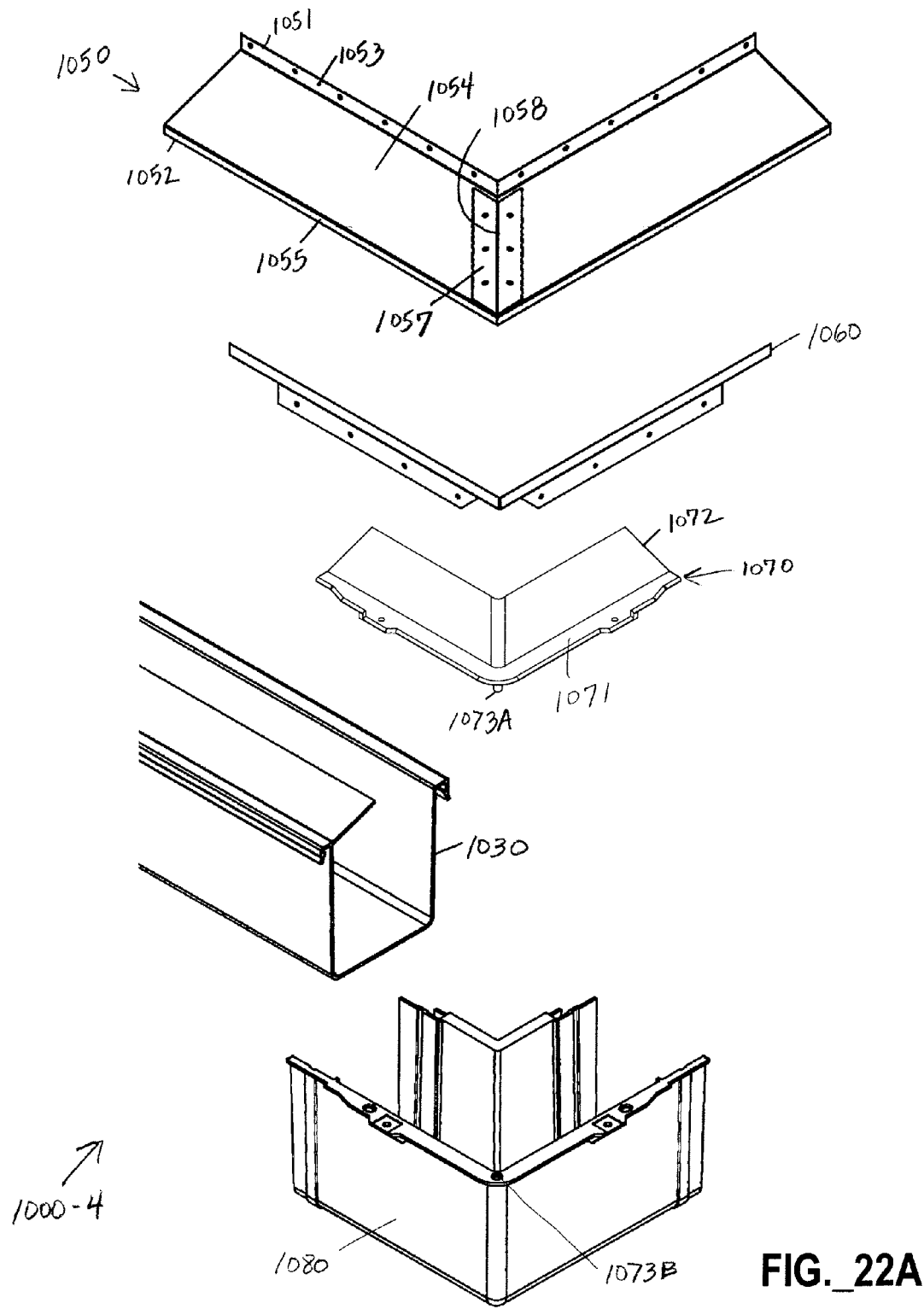
FIG. 22A is a perspective assembly view showing components of a portion of the grease containment apparatus illustrated in FIGS. 15A-15B and FIGS. 21A-21B.

Various aspects of the present invention relate to drain assemblies useable with grease containment apparatuses adapted to receive grease from rooftop grease exhausters, and adapted to gravimetrically separate grease and water to permit water removal by evaporation and/or draining, preferably without requiring use of grease absorbent material.

In certain embodiments, a grease containment system is modular in character, and comprises multiple standardized pieces that may be readily assembled in the field without requiring custom shop fabrication. Such a grease containment system may include standardized pieces such as: at least one trough or runner; at least one sump (preferably multiple sumps) such as may be embodied in a corner sump assembly or an end sump assembly having at least one sleeve portion arranged to receive therein an end of a trough or runner; at least one non-sump corner portion (preferably having at least one sleeve portion), one or more end caps arranged for fitment to an end of a trough or a sleeve portion of a corner sump assembly, an end sump assembly, or a non-sump corner portion; trough connectors; and rain shields (such as may be arranged for fitment to one or more of the foregoing components).

In certain embodiments, a grease containment system that is modular in character includes standardized pieces including multiple trough sections (e.g., optionally devoid of a sump) that may be arranged to surround a rooftop grease exhauster and include a drain assembly arranged to permit drainage of water. Such trough sections may include multiple corner trough sections with respective trough or runner section intermediately arranged between the multiple corner trough sections. Flashing may be arranged to direct grease received from the rooftop grease exhauster into at least one trough section. Rain shields may be associated with each trough section and arranged to inhibit ingress of rain water. Multiple hangers may be joined to a rooftop grease exhauster or a support structure thereof, and arranged to support the plurality of trough sections in an elevated position relative to a roof surface, wherein each hanger comprises multiple bends to impart flexibility in supporting the plurality of trough sections.

The above-described components (e.g., trough(s), sump(s) as may be embodied in trough sections (e.g., corner trough sections and trough or runner sections arranged therebetween), one or more corner sump assemblies and/or end sump assemblies, corner portions, end caps, and rain shields) are preferably fabricated of polymeric materials, by any suitable processes such as molding (including but not limited to injection molding). Straight trough or runner sections may also be formed by extrusion or similar processes. In one embodiment, average wall thicknesses are in a range of from 0.125 inch to about 0.250 inch (about 3.2 mm to about 6.4 mm). Desirable polymeric materials include materials resistant to modification or degradation in exposure to ultraviolet radiation. Polymeric materials that may be used include polyvinyl chloride (PVC), PVC copolymers or blends, acrylonitrile-butadiene-styrene (ABS) copolymer, and Acrylonitrile Butadiene Styrene/Polycarbonate (ABS/PC) copolymer or alloy. ABS/PC exhibits high flow, toughness, and heat resistance, as well as improved stiffness over conventional high impact ABS. Such polymeric material may desirably be dark in color to promote absorption of heat (e.g., from sunlight) to accelerate evaporation of water within the grease containment apparatus. Colorant may be added. Various conventional additives such as UV stabilizers and flame retardants may optionally be added to the polymeric material, and reprocessed polymeric materials, rather than virgin materials, may be used. Following molding thereof, exterior surfaces may be textured by sandblasting, thermal imprinting, scoring, or other conventional means to provide increased surface area for heat transfer as well as improved aesthetics. If desired, the above-described pieces (e.g., trough sections, sumps, corner portions, end caps, rain shields) may be easily cut in the field using a manually operated hacksaw or cordless circular saw. The foregoing pieces may be sealed to one another via any desirable means, with solvent welding or adhesive bonding being particularly preferred.

In certain embodiments, any one or more of components such as trough sections, corner sumps, end sumps, non-sump corner portions, and/or trough connectors may include at least one hanger tab integrally formed with such component(s), and arranged to support the grease containment apparatus to receive grease from the rooftop grease exhauster. Such hanger tabs may be integrally molded with the foregoing components. In one embodiment, troughs are devoid of hanger tabs. In one embodiment, hanger tabs protrude upward and are disposed at right angles relative to one another to permit attachment of such tabs along corners of support frames for rooftop grease exhausters. One or more holes may be drilled or otherwise formed in such hanger tabs to permit screws to be driven therethrough to support the associated components.

In certain embodiments, trough sections include lip portions defining peripheral recesses that permit the trough sections to be supported by separate hangers or mounting brackets. Multiple hangers may be joined to a rooftop grease exhauster or a support structure thereof, and arranged to support the plurality of trough sections in an elevated position relative to a roof surface, wherein each hanger comprises multiple bends to impart flexibility in supporting the plurality of trough sections. Each mounting bracket or hanger may be in a Z-shaped configuration (with the "Z" shape including obtuse or acute angles between adjacent portions). Such mounting bracket or hanger may be formed by any suitable material, e.g., metal such as galvanized spring steel, stainless steel, aluminum, or the like. It may be desirable to impart flexibility in supporting trough sections to accommodate installation as well as to address thermal expansion and/or vibration in operation of a rooftop grease exhauster.

In certain embodiments, components such as trough sections, corner sumps, end sumps, non-sump corner portions, and/or trough connectors include raised ridge elements positioned as travel stops for slip joints between components, with the raised ridges serving to aid in sealing between components joined by solvent welding or adhesive bonding. In one example, ends of a trough are arranged to fit into sleeve portions of components such as corner sumps, end sumps, non-sump corner portions, and trough connectors. Each trough has a preferably continuous raised ridge (i.e., as external raised ridge(s)) along exterior wall portions thereof, proximate to (e.g., within approximately 1 to 3 inches (25 to 75 cm) of ends of the trough. Similarly, each corner sump, end sump, non-sump corner portion, and trough connector preferably includes a preferably continuous raised ridge along interior wall portions thereof (i.e., as internal raised ridge(s)), proximate to (e.g., within approximately 1 to 3 inches (2.5 to 7.5 cm) of ends arranged to receive a trough. An end of a trough is inserted into a corresponding sleeve portion of a corner sump, end sump, non-sump corner portion, or trough connector (collectively, "the receiving component"), with the end of the trough preferably arranged to abut the raised ridge along interior walls of the receiving component, and with an end of the receiving component preferably arranged to abut the raised ridge along exterior walls of the trough. Such ridges therefore serve as travel stops for secure placement and to promote sealing between the trough and an adjacent receiving component. Multiple components as described above, including at least one sump (preferably multiple sumps), and at least one trough, are may be joined together to form an interconnected channel for retaining liquid.

In certain embodiments, components such as trough sections, corner sumps, end sumps, non-sump corner portions, and trough connectors include recesses positioned along all surfaces of slip joints between components, with such recesses being arranged to receive sealant (e.g., adhesive or solvent) or other material (e.g., gasket material) to aid in sealing between such components.

In certain embodiments, multiple sumps are provided in a grease containment apparatus and are connected by at least one trough. Presence of multiple sumps is desirable to accommodate variations in pitch and available positioning for the grease containment apparatus, without requiring careful leveling of the various pieces of the apparatus. That is, presence of multiple phones makes it more likely that at least one sump will be arranged lower than other interior portions of the grease, so that grease and any incident rainfall will flow to the low-lying sump. Additionally, presence of multiple sumps provide increased capacity for retaining liquid, including grease and water, thereby extending the requisite interval for cleaning the grease containment apparatus. At least one component (e.g., trough) of a grease containment apparatus is preferably arranged to receive grease from the roof-mounted grease exhauster via a pipe or spout directing grease into such component. In one embodiment, grease is directed via a pipe or spout into a trough disposed between two corner sumps, to ensure that grease will flow into at least one sump despite potential differences in level between such sumps.

Various components of a grease containment apparatus (e.g., trough sections, corner sump assemblies, end sump assemblies, and/or corner portions) may have associated rain shields to deflect at least a portion of incident rain and thereby reduce accumulation of water therein. A rain shield preferably includes a downwardly-sloped upper wall to direct incident rain away from the interior of the grease containment apparatus. In one embodiment, a rain shield is integrally formed with a trough or runner section along an upper portion thereof, such as by molding the rain shield and the trough together as a single component. Rain shields may be formed separately from, but later added to, other components such as corner sumps, end sumps, and non-sump corner portions. Preferably, each rain shield does not fully cover an underlying component, and instead leaves a gap along an upper surface thereof to permit escape of water vapor from the interior of the grease containment apparatus. Such gap preferably also permits ingress of grease that may be discharged via a fan base (such as the base 506 illustrated in FIG. 9). As water collects in a grease containment apparatus according to the present invention (e.g., from direct ingress of rain and/or from the outlet of a grease exhauster), and grease collects therein, the water and grease will naturally separate due to differences in density, with the heavier water residing in a lower portion of the apparatus, and with the grease floating on top. As the grease collection apparatus (preferably dark colored polymeric material) is exposed to sunlight, walls of the apparatus are heated, thus preventing solidification of the grease, and also promoting vaporization of the water. This natural escape of water from the grease containment apparatus, combined with use of rain shields, reduces likelihood that the apparatus will overflow due to presence of large amounts of water, and may eliminates the continuous need for grease separation and/or absorbent media within the grease containment apparatus. A preferred grease containment apparatus is therefore devoid of grease absorbent material within each sump and within each trough during routine operation.

In certain embodiments, one or more trough sections or sumps may includes a sealable (e.g., selectively closeable) drain aperture. Such a drain aperture may include a removable drain plug. A drain plug may include a threaded plug arranged to engage a female threaded portion of a sump wall, with the female threaded portion preferably including a wall portion of enhanced thickness to provide structural support for the threads and prevent leakage. In one embodiment, a drain aperture is disposed along a side wall of a sump. Such drain aperture defined in side wall of a sump may be positioned close to (e.g., within 1-4 inches (2.5 to 10 cm) of a bottom wall of the sump, so as to permit heavier water to be drained from a sump prior to draining of lighter grease that may be floating atop the water. In one embodiment, a drain comprises a threaded plug, preferably including a connector portion (e.g., protruding square profile, protruding hex profile, inverted square profile, inverted hex profile, or other conventional shapes) to permit manipulation of the drain plug with a wrench or other suitable tool. In another embodiment, a drain aperture is disposed along a bottom wall of a sump.

A drain aperture may be opened by a maintenance worker to drain a sump or trough section (e.g., to drain water to waste and/or to drain grease into a grease collection receptacle for subsequent disposal). At the time periodic maintenance of a grease containment apparatus is initiated, a grease exhauster outlet conduit may be temporarily diverted to a portable waste receptacle by a maintenance worker. Such worker may remove one or more rain shields (e.g., as arranged over a trough section, corner sump, end sump, corner portion, or end cap), and add a grease absorbent material to contact and absorb grease within the grease containment apparatus. A drain plug associated with a drain aperture of a sump or trough section may then be opened to permit gravity draining of water from the sump. The grease absorbent media may be removed. The grease containment apparatus may further be cleaned with water (optionally heated) and/or a surfactant, and suitably drained, and then the drain aperture may be re-sealed with the drain plug to ready the apparatus for continued operation.

In certain embodiments, a drain aperture (definable in a wall of a sump or trough section) includes an associated drain conduit. A drain conduit may further comprise a drain plug (e.g., threaded plug) adapted for periodic removal (e.g., to permit draining) and replacement. A drain conduit may alternatively or additionally include one or more valves to permit selective draining of contents of a grease containment system, such as to permit draining to waste and/or a receptacle such as a catch basin or portable disposal container. Such valve(s)

may be manually actuated, or automatically actuated responsive to one or more sensors arranged to sense level of liquid within a grease containment apparatus or portion thereof, and/or one or more rain sensors arranged to sense rainfall proximate to the grease containment apparatus. In one embodiment, multiple level sensors are arranged at different levels within a grease containment apparatus and operatively connected to a valve controller that receives inputs from a rain sensor. Sensing of a condition indicating rapid rise in liquid level within a grease containment apparatus, combined with receipt of significant rainfall, may indicate rapid accumulation of water within a grease containment system, and trigger need for opening of one or more valves (for draining of at least a portion of the contents of a grease containment apparatus) for a specified period of time or until a desired (low) liquid level is achieved, to prevent grease from overflowing a top portion of the grease containment apparatus. Actuated valves and control components may be operated by low voltage power, such as received from a grid-supplied AC/DC transformer, or optionally supplied by a battery fed by one or more solar cells arranged proximate to the grease containment apparatus (e.g., on a rooftop).

In one embodiment, a drain conduit operatively connected to a drain aperture of a sump of a grease containment apparatus defines a flow path, wherein at least a portion of the flow path is elevated above a bottom wall of at least one trough section or at least one sump of the grease containment apparatus. A drain conduit may include one or more elbows and associated pipes arranged in a vertical or upward-sloping configuration to provide such elevated portion of the flow path. Providing an elevated portion of a drain flow path ensures that liquid will drain from the trough section or sump (by gravity) via the drain flow path only when liquid level within the sump is higher than the highest point of the drain flow path. The highest point of the drain flow path may be pre-set relative to a bottom wall of at least one sump of a grease containment system through use of a section of vertically oriented pipe (or a sloping section of pipe), and comparison of the relative heights utilizing a laser level, bubble-type level, or similar tool. In one embodiment, the highest point of the drain flow path in a range of between about 1-12 inches (2.5-30 cm), more preferably between 2-8 inches (3-20 cm), and still more preferably about 3-6 inches (4.5-15 cm), above the lowest point (e.g., bottom edge or bottom wall) of at least one sump of a grease containment system. Such a drain conduit may be operatively connected to a side wall or a bottom wall of a trough section or sump of a grease containment apparatus. In one embodiment, a grease containment apparatus comprises multiple sumps or corner trough sections, and each sump or corner trough section has an associated drain conduit wherein a portion of a flow path defined by each drain conduit is above a bottom wall or edge of each sump or corner trough section. In one embodiment, a grease containment apparatus comprises multiple sumps or corner trough sections, and each sump or corner trough section has an associated drain conduit, wherein the drain conduits are both connected at a junction to supply liquid to one or more common outlets, wherein a portion of an interconnected flow path at or downstream of such junction is above a bottom wall or edge of each sump or corner trough section.

In one embodiment, at least one catch basin is arranged to receive water from a drain conduit of a grease containment assembly having at least one sump or corner trough section, wherein water is drained from a sump through a flow path including at least a portion that is elevated above a bottom wall of the sump. In one embodiment, the catch basin has an associated drain conduit defining a flow path that is elevated above a bottom wall of the catch basin, and water is drained from the catch basin through the catch basin flow path. Such a catch basin may be provided to catch grease that may be discharged from a grease containment apparatus (e.g., if the grease level should unexpectedly rise above the high point of the sump or corner trough section drain flow path). A catch basin may include an associated rain shield. A drain conduit for a catch basin may define a catch basin drain flow path including at least a portion arranged at a level above a bottom wall or edge of the catch basin, for draining of water from the catch basin through the catch basin drain flow path. In one embodiment, multiple catch basins may be arranged at different levels in cascading format, with one catch basin draining into another. Draining of water from a grease containment apparatus to one or more catch basins is preferably motivated exclusively by gravity. As an alternative to utilization of one or more catch basins, or in conjunction with use of one or more catch basins, grease absorbent material may be arranged to receive water discharged from a sump of a grease containment apparatus and/or a catch basin arranged downstream of such a grease containment apparatus. Grease absorbent material may optionally be placed within a catch basin. A grease absorbent material preferably is adapted to preferentially absorb grease relative to absorption of water.

Grease containment apparatuses and components therefor according to certain illustrative embodiments are depicted in the appended figures. Such figures are provided to aid in the understanding of exemplary embodiments and should not be construed to limit the extent or scope of Applicants' invention.

FIGS. 1A-1B illustrate a corner sump assembly 10 constituting part of a grease containment apparatus according to one embodiment of the present invention. The corner sump assembly 10 comprises a first side wall 11, second side wall 12, third side wall 13, fourth side wall 14, fifth side wall 15, and sixth side wall 16, as well as a bottom wall 17. The first side wall 10 and second side wall 12 meet at a corner 18. The first side wall 11 includes a thickened portion 23 defining a drain aperture 24 for receiving a drain plug 25 having an associated manipulating feature 25' (e.g., as illustrated, having a raised or protruding square profile arranged to permit grasping with a wrench (not shown)). The third side wall 13 and fourth side wall 14 each include a sleeve portion 26, 28 having arranged for receiving therein a trough section (not shown), with each sleeve portion 26, 28 including an internal raised ridge 27, 29 against which an end of a trough inserted into the sleeve portion 26, 28 may abut. The fifth side wall 15 and sixth side wall 16 include hanger tab portions 20, 21 extending upward therefrom (higher than the upper edge 22 of the first and second side walls 11, 12), and arranged at ninety degree angles relative to one another for mounting along a corner of a pedestal or duct support of a rooftop grease exhauster (not shown). A sump having a height coextensive with the height of the third and fourth side walls 13, 14, extends downward relative to the sleeve portions 26, 28, and is bounded by the bottom wall 17, and the first through sixth side walls 11-16.

FIGS. 2A-2E illustrate at least a portion of a grease containment apparatus 5 including one trough 30 connected to two corner sump assemblies 10A, 10B (such as depicted in FIGS. 1A-1B) according to another embodiment of the present invention. The grease containment apparatus 5 includes two open sleeves 28A, 27B to which additional components may be joined, such as additional troughs (not shown), or end caps 60 (as illustrated in FIG. 5). Each corner sump assembly 10A, 10B is substantially identical to the corner sump assembly 10 of FIGS. 1A-1B, with each corresponding portion thereof including a label terminated with "A" or "B," respectively. Each corner sump 10A, 10B includes a first side wall 11A, 11B, second side wall 12A, 12B, third side wall 13A, 13B, fourth side wall 14A, 14B, fifth side wall 15A, 15B, sixth side wall 16A, 16B, and bottom wall 17A, 17B, with the first side walls 11A, 11B meeting the second side walls 12A, 12B at corners 18A, 18B. Each first side wall 11A, 11B includes a thickened portion 23A, 23B defining a drain aperture 24A, 24B for receiving a drain plug 25A, 25B having an associated manipulating feature 25'A, 25'B. Each third side wall 13A, 13B and fourth side wall 14A, 14B each include a sleeve portion 26A, 26B, 26B, 28B, with sleeve portions 26A, 28B receiving the trough 30, and with the other sleeve portions 26B, 28A illustrated as being open. Each sleeve portion 26A, 26B, 28A, 28B includes an internal raised ridge 27A, 27B, 28A, 28B for abutting an end of a trough inserted therein. The fifth side walls 15A, 15B and sixth side walls 16A, 16B include hanger tab portions 20A, 20B, 21A, 21B extending upward therefrom.

As shown in FIGS. 2A-2E and FIGS. 3A-3C, the trough 30 includes a rear wall 31, a bottom wall 32, a front wall 33, and a trough rain shield portion 34. The trough rain shield portion 34 is angled upward relative to the front wall 33 in a direction toward the back wall 31, but the trough rain shield portion does not fully extend to contact the back wall 31, thereby leaving a gap between the rain shield portion 34 and the back wall 31 to permit escape of vapor generated by evaporation of water within the grease containment assembly 5. The rear wall 31 preferably extends higher than the front wall 33.

If a trough 30 provided in a standard length is not long enough to span an entire side of a pedestal or duct supporting a rooftop grease exhauster (not shown), then multiple troughs (or portions thereof) may be connected to one another utilizing a trough connector, such as the trough connector 80 shown in FIGS. 10A-10B. The trough connector 80 includes a first side wall 81, second side wall 83, and a bottom wall 82, with a raised ridge 86 defined along internal surfaces of the walls 81-83. Ends of two troughs or sections thereof may be inserted into the open ends of the trough connector 80 and affixed thereto, such as by solvent welding, adhesive connection, or any other suitable attachment means preferably providing sealing engagement without leakage between connected components. In one embodiment, sealing gaskets (not shown) may be provided between adjacent components at the time of assembly FIGS. 4A-4B illustrate an end sump assembly 40 constituting part of a grease containment apparatus according to one embodiment of the present invention. The end sump assembly 40 includes a first side wall 41, second side wall 42, third side wall 43, fourth side wall 44, and bottom wall 45. The second side wall 42 includes a thickened portion 53 arranged to receive a drain plug having a manipulating feature 55'. The sleeve portion 46 includes an internal raised ridge 46 arranged to abut an end of a trough (not shown) inserted into the sleeve portion 46. A sump having a height coextensive with the height of the fourth side walls 44, extends downward relative to the sleeve portion 46, and is bounded by the bottom wall 45 as well as the first through fourth side walls 41-44. The first side wall 48 and second side wall 42 meet at a first corner 48, and the second side wall 42 and the third side wall 43 meet at a second corner 49. Hanger tabs 51, 52 extend upward from the first and third side walls 41, 43, and are preferably integrally formed with the end sump assembly 40. Presence of hanger tabs 51, 52 on opposing side walls 41, 43 permits the end sump assembly 40 to be interchangeably mounted with either the first or third side walls 41, 43 adjacent to a pedestal or duct support of a roof top grease exhauster (not shown).

FIGS. 6A-6B illustrate a rain shield 70 arranged for use with a corner sump assembly or corner trough assembly (as illustrated and described elsewhere herein). Unlike the rain shield portion 34 that is preferably integrally formed with the trough 30 (e.g., via molding), the rain shield 70 is preferably formed separately from an corner sump assembly or corner trough assembly, due in part to difficulty of forming same with such a corner sump assembly or a corner trough assembly, and due in part to permit removability of the rain shield 70 to enable cleaning of a corner sump assembly. A rain shield 70 includes a first side wall 71, second side wall 72, first angled wall 73, second angled wall 74, and a corner 75, with the walls 71-74 extending between two ends 78, 79. The rain shield 70 is preferably removably affixed to a corner sump assembly or corner trough assembly by any conventional means, such as but not limited to screws or similar fasteners.

FIG. 7 illustrates a grease containment apparatus 105 including four troughs 130A-130D, two corner sump assemblies 110A, 110B, and two corner trough assemblies 180C, 180D according to one embodiment of the present invention. Such components 130A-130D, 110A, 110B, 180C, 180D may be affixed to one another via solvent welding, adhesive joining, or other conventional attachment means. The grease containment apparatus 105 is adapted for mounting to a duct support of a rooftop grease exhauster fan (such as the duct 504 illustrated in FIG. 9), preferably with a grease discharge pipe or spout positioned over the first trough 130A disposed between corner sump assemblies 110A, 110B to ensure that any grease discharged into the apparatus 105 will tend to flow toward a sump associated with one or the other of the corner sump assemblies 110A, 110B.

Each corner sump assembly 110A, 110B is substantially identical to the corner sump assemblies 10A, 10B of FIGS. 2A-2E with corresponding reference numerals increased by 100. To promote simplicity and ease of understanding, reference numerals for certain elements have been omitted from FIG. 7. Although rain shield portions are preferably integrally formed with the troughs 130A-130D, rain shield portions have been omitted from the troughs 130A-130D to promote simplicity and ease of understanding; likewise, each corner sump assembly 110A, 110B and corner trough assembly 180C, 180D is illustrated without addition of any corner rain shield (such as the shield 70 shown in FIGS. 6A-6B), but it is to be understood that such rain shields would preferably be present in a preferred embodiment.

Each trough 130A-130D includes a rear wall 131A-131D, bottom wall 132A-132D, and front wall 133A-133D. Each trough 130A-130D is inserted into sleeve portions provided by two different corner sump assemblies 110A, 110B and/or corner trough assemblies 180C, 180D. Raised ridges may be formed along external wall portions proximate to ends thereof.

Each corner sump assembly 110A, 110B includes a first side wall 111A, 111B and a second side wall 112A, 112B meeting at corners 118A, 118B, respectively. Each corner sump assembly 110A, 110B further includes two sleeve portions 126A, 128A, 126B, 128B, and a bottom wall 117A, 117B that is positioned below the sleeve portions 126A, 128A, 126B, 128B. Hanger tab portions 120A, 121A, 120B, 121B extend upward relative to the first and second side walls 110A, 112A, 110B, 112B.

Each corner trough assembly 180C, 180D is similar to the corner sump assemblies 110A, 110B except for the lack of a sump portion. Each corner trough assembly 180C, 180D includes first and second side walls 181C, 181D, 182C, 182D and a bottom wall 184C, 184D, with two sleeve portions 196C, 198C, 196D, 198D. Hanger tab portions 190C, 191C, 190D, 191D extend upward relative to the first and second side walls 181C, 181D, 182C, 182D.

FIG. 9 illustrates a rooftop grease exhauster 500 including a fan 502, a fan base 506, and a kitchen exhaust duct 504 to which a multi-sump grease containment apparatus 5 according to one embodiment of the present invention is mounted. The exhaust duct 504 protrudes upward from a roof 508 of a building. A grease drain pipe 507 is arranged to conduct grease from the exhauster fan 502 behind a trough rain shield portion 34 (and front wall 33) into a trough 30 of the grease containment apparatus 5, between corner sump assemblies 10A, 10B of such apparatus 5. Each corner sump assembly 10A, 10B is suspended from the duct 504 by attachment of the hanger tabs 20A, 21B to the duct 504. Each corner sump has a bottom wall 17A, 17B arranged along a lower edge of side walls 11A, 11B, 12A, 12B, with one side wall of each corner sump assembly 10A, 10B defining a drain aperture 25A, 25B having an associated removable plug. While ideally grease is meant to collect and discharge through the grease spout, some grease may discharge around the fan base 506 that serves to connect the exhaust fan 502 to the exhaust duct 504. Preferably, the grease containment apparatus is assembled to form a continuous gutter around the entire duct 504, assuming lack of interference with adjacent structural elements and/or mechanical equipment (not shown) arranged on the rooftop 508 proximate to the duct 504. In one embodiment, adhesive and/or sealing gasket material (not shown) may be provided between each component of a grease containment system 5 (e.g., trough(s) 30, corner sumps 10A, 10b, etc.) and the exhaust duct 504 to ensure than an grease leaking from the fan base 506 does not seep between the duct 504 and the grease containment assembly 5 mounted thereto, but rather collects in the grease containment assembly 5 as intended.

Although one-sided and four-sided grease containment apparatuses have been illustrated in the accompanying figures, it is to be appreciated that grease containment apparatuses having one, two, three, or four sides may be constructed utilizing components as described herein, and easily assembled in the field utilizing such components without requiring custom shop fabrication (as has been required with traditional sheetmetal-based trough systems including grease absorbent media). A kit including various pre-made components (e.g., troughs, sumps, corner portions, trough connectors, end caps, rain shields) as described above herein may be installed in the field, optionally including steps such as taking measurements in the field, cutting any standardized polymeric components (e.g., via manually operated hacksaw or cordless circular saw), joining corner and/or end assemblies to an exhaust duct (or other fan support) with fasteners, affixing troughs (optionally including intermediate trough connectors) to the corner and/or end assemblies (e.g., preferably using solvent welding and/or adhesive joining), and covering any corner and/or end assemblies with associated rain shields.

As described previously herein, certain embodiments include use of sumps having associated drain conduits, wherein at least a portion of a flow path defined by the drain conduit is arranged higher than a bottom wall of an associated sump. FIGS. 8A-8C illustrate corner sump assemblies 210, 310, 410 each having a drain conduit in a different configuration.

Referring to FIG. 8A, a corner sump assembly 210 includes a first side wall 211 defining an aperture into which a connector 281 is fitted. The corner sump assembly 210 further includes a second side wall 212 (which meets the first side wall 211 at a corner 218), a third side wall 213 disposed below a sleeve portion 215, a bottom wall 217, and a hanger tab 220 extending above a top edge 222 of the first and second side walls 211, 212. A pipe 282 extends outward from the connector 281, and an elbow 283 with an associated rain cover 287 extends from the pipe 282. The elbow 283 and rain cover 287 are optionally disposed above a catch basin 290 (which may optionally include grease absorbent material and/or another drain pipe (not shown)). The rain cover 287 prevents ingress of rain water into the elbow 283, but is open along sides thereof to permit discharge of water from the sump portion (e.g., having height coextensive with the third side wall 213) of the corner sump assembly 210 when the water level within the sump rises above the opening between the elbow 283 and the rain cover 287. Height of such opening relative to the bottom wall of the sump (e.g., bottom wall 217) may be adjusted by including a longer elbow 283 and/or providing an optional pipe section (not shown) extending upward from the elbow 283. The intention is to draw water from a lower portion of a grease containment assembly (e.g., the corner sump assembly) without discharging grease, which will tend to float above any water residing within a grease containment assembly due to gravimetric separation between the two. Such drain conduit may be provided in an environment subject to substantial rainfall. In one embodiment, water is added to a corner sump assembly after cleaning thereof is complete, to ensure that a minimum water level is provided in the sump so as to prevent grease from draining via a drain conduit.

Referring to FIG. 8B, a corner sump assembly 310 includes a first side wall 311 defining an aperture into which a connector 381 is fitted. The corner sump assembly 310 further includes a second side wall 312 (which meets the first side wall 311 at a corner 318), a third side wall 313 disposed below a sleeve portion 315, a bottom wall 317, and a hanger tab 320 extending above a top edge 322 of the first and second side walls 311, 312. Extending outward from the connector 381 is a pipe 382, a first elbow 383, a flow reversing element 385, and an outlet pipe 386. The flow reversing element 385 is disposed above the bottom wall 317 of the sump portion of the corner sump assembly 310 (with the height of the sump portion being coextensive with the third wall 313). The outlet pipe 386 is optionally disposed above a catch basin 290 (which may optionally include grease absorbent material and/or another drain pipe (not shown)). When water level within the sump rises above the flow reversing element 385, water will flow (via gravity) through the drain conduit (including conduit elements 382, 383, 385, 386) to the optional catch basin 390.

Referring to FIG. 8C, a corner sump assembly 410 includes a first side wall 411, a second side wall 412 that meets the first side wall 411 at a corner 418, a third side wall 413 disposed below a sleeve portion 415, and a hanger tab 420 extending above a top edge 422 of the first and second side walls 411, 412. Extending from the bottom wall is a first elbow 491, a lateral pipe 491, a second elbow 493, a vertical pipe 494, a flow reversing element 495, and an outlet pipe 496. The flow reversing element 495 is disposed above the bottom wall 417 of the sump portion of the corner sump assembly 410 (with the height of the sump portion being coextensive with the third wall 413). The outlet pipe 496 is optionally disposed above a catch basin 490 (which may optionally include grease absorbent material and/or another drain pipe (not shown)). When water level within the sump rises above the flow reversing element 495, water will flow (via gravity) through the drain conduit (including conduit elements 491, 492, 493, 494, 495, 496) to the optional catch basin 490.

Although various drain assemblies and draining arrangements have been described herein as applied to sumps, it is to be recognized that such drain assemblies and draining arrangements may also be applied to trough sections (e.g., corner trough sections).

Further embodiments of the present invention relate to a drain assembly arranged to provide automatic draining utility when liquid has attained a specified level, and also relate to a grease containment apparatus including at least one such drain assembly. A drain assembly 600 according to one embodiment is shown (i.e., in cross-sectional views) in FIGS. 11A-11C. The drain assembly 600 includes an outer conduit 610, an inner conduit 630, a cap 601, a grease absorbing medium 640, a filtration screen 650, and a base conduit section 620. (In certain embodiments, such as described hereinafter in connection with FIG. 13, the grease absorbing medium and/or filtration screen may be omitted.) Each of the outer conduit 610, the base conduit section 620, and the filtration screen 650 may have approximately the same interior dimensions (e.g., inner diameter), and may be annular in shape (or any other desirable cross-sectional shape, such as oval, square, etc.), with the filtration screen 650 being stacked between outer conduit 610 and the base conduit section 620. The inner conduit 630 is disposed within (and extends through) interior portions of the outer conduit 610, the base conduit section 620, and the filtration screen 650. Spacer elements 613A, 613B protrude inward from an inner surface 612 of the outer conduit 610, and are arranged to maintain the inner conduit 630 in a substantially concentric relationship with the outer conduit 610. The spacer elements 613A, 613B are arranged as vertical strips that do not impede upward flow of liquid within a first flow passage 619 arranged between the inner surface 612 of the outer conduit 610 and the outer surface 631 of the inner conduit 620, with the first flow passage 619 extending between an inlet opening of the outer conduit 610 (such inlet opening of the outer conduit 610 being along the lower edge 615 thereof, abutting the filtration screen 650) and an outlet opening of the outer conduit 620 (corresponding to the upper edge 634 of the inner conduit 630). The spacer elements 613A, 613B may be integrally formed along the inner surface 612 of the outer conduit 610, such as by extrusion, molding or any other suitable fabrication method. In one embodiment, the spacer elements 613A, 613B may be formed as standalone elements, or integrally formed along the outer surface 631 of the inner conduit 630. An upper end of the outer conduit 610 is closed by a cap 601 having a downwardly extending lip 602.

An annular shaped grease absorbing element 640 having a wider central portion 641 and tapered narrower upper and lower portions 643, 644 is arranged to surround the filtration screen 650, with the tapered upper portion 643 of the grease absorbing element 640 being affixed to the outer surface 611 of the outer conduit 610, and with the tapered lower portion 644 of the grease absorbing element 640 being affixed to the outer surface 621 of the base conduit portion 620. The grease absorbing element 640 is preferably elevated (e.g., using the base conduit portion 620, at a height of preferably at least about 2 cm, more preferably at least about 5 cm) relative to a bottom wall of a trough or sump to which the drain assembly 600 is affixed, to allow heavy components (settling grease) to remain at the base of the trough or sump, and not travel into the interior of the drain assembly 600. Sealing engagement between the upper and lower portions 643, 644 of the grease absorbing element 640, the outer conduit 610, and the base conduit portion 620 may be completed by any suitable permanent or disengageable method, such as (but not limited to) adhesives, thermal sealing, clamping, compressive retention (e.g., with plastic cable tie, tie wrap, or similar), and the like. Such arrangement prevents leakage of liquid past the grease absorbing element 640; instead, liquid must flow through the grease absorbing element 640 (from the periphery thereof to an inner surface 642 thereof) to reach the filtration screen 650 and the interior of the drain assembly 600. In one embodiment, sealing engagement between the grease absorbing element 640 and each of the outer conduit 610 and the base conduit 620 is temporary (e.g., using cable ties), to permit the grease absorbing element 640 to be periodically changed if necessary. The grease absorbing element 640 may comprise any material suitable for inhibiting passage of grease (e.g., by absorption thereof) but allowing passage of water, such as by absorbing grease in preference to absorbing water. In one embodiment, the grease absorbing element comprises cellulosic material (e.g., cellulosic filtration media). In one embodiment, the grease absorbing material may comprises a plurality of different materials arranged in layers, including at least two of a filtration layer, a grease absorbent layer, and a grease barrier layer, all arranged to permit the passage of water.

The drain assembly 600 is suitable for use in a 'brown water' environment comprising grease, water, and possibly solids, such as the environment within a grease containment assembly as described herein. Although a grease containment apparatus as described herein is intended to retain grease, such an apparatus may receive substantial amounts of water when subjected to heavy rainfall, thus contributing to potentially rapid formation of brown water. The drain assembly 600 may be affixed to a bottom surface of a trough or sump (not shown) of a grease containment assembly (such as described herein), with a lower edge 625 of the base conduit section 620 sealed to the bottom wall of the trough or sump, and with the inner conduit 630 also being sealed to the bottom wall of the trough or sump, but providing a flow path (including the bore 639 of the inner conduit 630) that extends through the bottom wall of the trough or sump. In other words, only the inner conduit 630 (or an extension of such conduit) pierces the bottom wall or floor of a trough or sump to which the drain assembly 600 is affixed, with the area between the lower edge 625 of the outer conduit 620 and the lower edge of the inner conduit 635 representing a stagnant area 617 (shown in FIG. 11C) subject to collection of water. The outer surface 611 of the outer conduit 610 is in contact with brown water. The upper edge 634 of the inner conduit is equal to the maximum neutral brown water level within the sump or trough (preferably sump) in which the drain assembly 600 is installed.

In operation, as the level of brown water contacting the drain assembly 600 rises within a grease containment apparatus, a water component of the brown water flows via gravity through the grease absorbing element 640, while a grease component of the brown water may be absorbed by the grease absorbing element 640. After flowing through the grease absorbing element, the water component flows through the filtration screen 650 (e.g., to prevent passage of solids in case the grease absorbing element 640 should rupture) and into an annular space (or first flow passage) 619 between the interior wall surface 612 of the outer conduit 610 and the exterior wall surface 631 of the inner conduit 630. Brown water cannot enter the upper end 614 of the outer conduit 610 due to sealing of the upper end 614 with the cap 601. The level of the water component within the first flow passage 619 is substantially the same as the brown water level contacting the exterior wall surface 611 of the outer conduit 610. When the brown water level contacting the exterior wall surface 611 of the outer conduit 610 rises above the upper surface 634 of the inner conduit 610, thereby causing the water component within the first flow passage 619 to similarly rise above the upper surface 634 of the inner conduit 610, the water component will flow into the upper end (or inlet opening) 634 of the inner conduit 630 to the bore (second flow passage) 639, and flow downward by gravity through the lower end (or outlet opening) 635 of inner conduit 630 to exit the drain assembly 600. Use of one or more drain assemblies 600 in a grease containment apparatus (e.g., arranged in sumps thereof) can therefore prevent rapid accumulation of water (e.g., via rainfall) from causing brown water to overflow the grease containment apparatus; instead, a water component is separated from the brown water and automatically drained when brown water level rises above a level equal to the upper surface 634 of the inner conduit 630.

FIG. 12 is an elevation cross-sectional view of the drain assembly of FIGS. 11A-11B operatively connected to a corner sump assembly 710 having a bottom outlet (namely, a bottom outlet tube section 660) arranged to drain liquid (e.g., water component) to an optional catch basin 690. The corner sump assembly 710 includes a side wall 713B, a hanger tab portion 721, raised rib portions 727, 729, a sleeve portion 726, side walls 712, 713, and a bottom wall 717. The drain assembly 600 includes the same components as described in connection with FIGS. 11A-11C. As shown in FIG. 12, the upper end (or inlet opening) 634 of the inner conduit 630 should be arranged at a level below the upper edge 722 of the wall 712 of the corner sump 710, so that water component may drain from the sump 710 via the drain assembly 600 without brown water overflowing the upper edge 722 of the sump 710.

In one embodiment, a grease containment apparatus as described previously includes at least one drain assembly as described in connection with FIGS. 11A-11B, with an outlet opening of the drain assembly operatively connected with an outlet of at least one trough section or sump of the grease containment apparatus. In one embodiment, a multi-sump grease containment apparatus as described herein includes a plurality of drain assemblies as described herein, such as with different sumps each having a separate associated drain assembly. In combination, a drain assembly and grease containment system as described herein may be used to automatically and preferentially drain water in comparison to grease from the grease containment apparatus, and do so in a manner exclusively motivated by gravity.

In one embodiment, an elbow (e.g., ninety degree elbow or equivalent combination of fittings) may be fitted to the lower end (outlet opening) 635 of the inner conduit 630, and the drain assembly 600 may be mated to an opening defined in a side wall of a trough or sump (preferably a sump), such as one of the drain apertures 24A, 25A of the corner sumps 10A, 10B of the grease containment assembly 5 illustrated and described in connection with FIGS. 2A-2E. It is therefore clear that the drain assembly 600 need not be affixed to a bottom wall of a trough or sump, as it may be affixed to a side wall thereof.

It is to be appreciated that the drain connector 600 as disclosed herein is not limited for use with grease containment apparatuses; rather, such drain connector 600 or variants thereof (e.g., omitting one or more elements disclosed herein, and/or including additional optional elements) may be utilized in other environments wherein automatic draining is required.

In one embodiment, a pump may be operatively coupled with a drain connector as disclosed herein, optionally with one or more appropriate sensors (e.g., level sensors, pressure sensors conductivity sensors, etc.) arranged in or along the drain connector to permit control of the pump responsive to signals received from the pump.

FIG. 13 illustrates another drain assembly 800 suitable for use with a grease containment apparatus, the drain assembly 800 including a capped (or otherwise closed) outer conduit 810, an inner conduit 830 disposed within the outer conduit 810, and a liquid inlet passage 851 arranged above a bottom of the drain assembly (and preferably arranged above a bottom wall of a trough section or sump to which the drain assembly 800 may be connected). The inner conduit 830 and outer conduit 810 may be annular in shape, or any other desirable cross-sectional shape. The inner conduit 830 is disposed within (and extends through) interior portions of the outer conduit 810 and the base conduit section 820. Spacer elements (not shown) may or may not be provided between the inner conduit 830 and outer conduit 810. A gap 819 is provided between an inner wall 812 of the outer conduit 810 and an outer wall 831 of the inner conduit 830.

The drain assembly 800 is suitable for use in a 'brown water' environment comprising grease, water, and possibly solids, such as the environment within a grease containment assembly as described herein. Even with omission of a filtration screen and/or grease absorbing element (as illustrated in connection with FIGS. 11A-11C), discharge of grease may be avoided. The outer surface 811 of the outer conduit 810 may be in contact with fluid having varying composition with depth—with heavy solids and sludge settling to a bottom layer, somewhat lighter water settling to an intermediate layer, and a lighter grease fraction floating above the water in a top layer. So long as the fluid inlet 851 into the drain apparatus 800 is above the bottom layer of heavy material but below the top layer of lighter grease fraction, the majority of fluid draining from the drain assembly 800 should constitute water. Once the level of fluid contacting the drain assembly 800 rises to a level above the top edge 834 of the inner conduit 830 (or other opening (not shown) as may be defined in the inner conduit 830), fluid will flow from the inlet 851 through the intermediate area 819 between the conduits 810, 830 and over the top edge 834 into the bore 839 of the inner conduit 830 and exit via the lower edge 635 of the inner conduit 830 into the base conduit section 820 (preferably connected to a discharge pipe (not shown)).

FIG. 14 is a side cutaway view of a portion 1000-1 of a grease containment apparatus 1000 including the drain assembly 800 of FIG. 13, with a fitting 1010 and an associated drain pipe 1011 connected to the drain assembly 800. The drain assembly 800 is mounted to a bottom wall of a corner trough assembly 1080 having an associated rain shield 1070 covering a portion thereof. The corner trough assembly 1080 is supported along an inner edge thereof with an external mounting bracket 1060 having multiple bends and affixed to a base portion or support for a rooftop grease exhauster. Flashing 1050 extends over or across the mounting bracket 1060 and overlaps a portion of the corner trough assembly and/or an associated (straight) trough or runner section to direct a flow of grease 1 downward into the trough section(s). Within the corner trough section 1080, lighter components of the grease form a top layer 2, water forms an intermediate layer 3, and heavier materials such as solids form a bottom layer 4. Such layers 204 contact exterior walls 811, 821 of the drain assembly 800, but only the intermediate (water) layer 3 is arranged to contact a fluid inlet 851 arranged on the outer wall 811 of the drain assembly 800.

FIG. 15A is a perspective view of a grease containment apparatus 1000 according to one embodiment of the present invention as mounted to a rooftop grease exhauster 900, and FIG. 15B illustrates the same grease containment apparatus 1000 without the exhauster. The rooftop grease exhauster 900 includes an exhauster fan 902 supported by a base or pedestal 906 having a cover 904 supported by hinges 903 to facilitate cleaning and/or servicing of the exhauster 900. The grease containment apparatus 1000 surrounds all four sides of the exhauster fan 900 with corner trough sections 1080 and (straight) trough or runner sections 1030. Each trough or runner section 1030 includes an integral rain shield, whereas separate rain shields or corner covers 1070 are provided over portions of the corner trough sections 1080. The various trough sections 1030, 1080 are supported by support brackets 1060 each including multiple bends. Flashing 1050 extends over and across the support brackets 1060 to partially overlap the trough sections 1030, 1080 and provide a path for transit of grease into the (straight runner and corner) trough sections 1030, 1080. The mounting brackets 1060 and flashing 1050 may be fabricated of metal, whereas the trough sections 1030, 1080 and corner covers 1070 are preferably formed of polymeric materials.

Each straight trough or runner section 1030 shown in FIGS. 15A-15B is illustrated in further detail in FIGS. 16A-16B. Each straight trough or runner section 1030 includes a rear wall 1031, a bottom wall 1032, a front wall 1033, and a trough rain shield portion 1034. The trough rain shield portion 1034 is angled upward relative to the front wall 1033 in a direction toward the back wall 1031, but the trough rain shield portion 1034 does not fully extend to contact the back wall 1031, thereby leaving a gap between the rain shield portion 1034 and the back wall 1031 to permit escape of vapor generated by evaporation of water within the grease containment assembly 1000 of FIGS. 15A-15B. Along an upper corner of the front wall 1033, a protruding lip 1037 extends forward and supports a downwardly-extending angled tab portion 1038 bounding a recess 1039-2 including an undercut portion above the angled tab portion 1038. Along an upper corner of the back wall 1031, a protruding lip 1035 extends rearward and supports a downwardly-extending angled tab portion 1036 bounding a recess 1039-1 including an undercut portion above the angled tab portion 1036. The straight trough or runner section 1030 is preferably formed of polymeric material by injection molding or extrusion.

Each corner trough section 1080 shown in FIGS. 15A-15B is illustrated in further detail in FIGS. 17A-17B. A corner trough section 1080 includes a first side wall 1081, second side wall 1082, third side wall 1083, fourth side wall 1084, and a bottom wall 1087. The first side wall 1080 and second side wall 1082 meet at a corner 1088, whereas the third and fourth side walls 1083, 1084 meet at another corner 1089. The first and second side walls 1081, 1082 terminate vertically at an outwardly extending outer upper wall or shelf 1086 defining various holes for receiving connectors (e.g., screws, not shown) for attaching a rain shield or corner cover 1070. The third and fourth side walls terminate vertically at an outwardly extending inner upper wall or shelf 1087 contacting a downwardly-extending curb 1090 having extensions 1091, 1092. The wall or shelf 1087 in combination with the curb 1090 is arranged to receive an upper end of an external mounting bracket 1060 (as shown in FIG. 14). The corner trough section 1080 includes two sleeve portions 1096, 1098 each arranged to receive ends of a different straight trough or runner section. One sleeve portion 1096 extends from the second and fourth walls 1082, 1084, whereas the other sleeve portion 1098 extends from the first and third walls 1081, 1083. Each sleeve portion 1096, 1098 has an internal raised ridge 1097, 1099 against which an end of a straight trough section inserted into the sleeve portion 1096, 1098 may abut. Each sleeve portion 1096, 1098 further has a recess 1093, 1095 arranged to receive sealant (e.g., adhesive or solvent) or other material (e.g., gasket material) to aid in sealing between respective the corner trough portion 1080 and an associated straight trough or runner section 1030. Each corner trough 1080 is preferably formed of polymeric materials, such as by injection molding or other molding techniques.

FIG. 18A is a perspective view of a portion 1000-2 of the grease containment apparatus 1000 of FIGS. 15A-15B, including a single straight trough or runner section 1030 mated with a corner trough section 1080 containing a drain assembly 800. FIG. 18B is a magnified view of a portion (i.e., dashed rectangular portion labeled 'F18B') of FIG. 18A, showing interconnection between the straight trough or runner section 1030 and the corner trough section 1080 along an upper peripheral edge thereof. An end of the straight trough or runner section 1030 is inserted into a sleeve portion 1098 of the corner trough section 1080, with a portion of the outer upper wall or shelf 1086 extending into an undercut portion of the recess 1039-2 bounded by the protruding lip 1037 and the tab portion 1038.

FIG. 19 is a perspective view of mounting bracket portions 1060 of the grease containment apparatus of FIGS. 15A-15B mounted to a pedestal base 906 of a rooftop grease exhauster including a fan 902, a grease discharge line 907, and an electrical junction box 909 with associated electrical conduit 908. Each mounting bracket portion 1060 includes a lower edge 1061, an upper edge 1062, an vertically arranged first section 1063 extending upward from the lower edge 1061, a vertically arranged third section 1065 extending downward from the upper edge 1062, and an outwardly-angled second section 1064 intermediately disposed between the first and second sections 1063, 1065, with one bend arranged between each of the first and second sections 1063, 1064 and the second and third sections 1064, 1065. The resulting profile of the mounting bracket is a stretched Z-like shape (as shown in FIG. 20), with obtuse angles between the intermediate section 1064 and the end sections 1063, 1065. Each mounting bracket 1060 is preferably formed as two portions joined at a corner 1068 (i.e., to impart strength), and is thereby arranged to mate with two walls of a grease exhauster base or pedestal 906 around a corner thereof. One advantage of providing separate mounting brackets proximate to vertical corners of the grease exhauster base or pedestal 906 (i.e., rather than continuous brackets each extending along the entire length of one wall of the base or pedestal 906) is that interference with intermediate structures (e.g., conduit 908 and junction box 909) can be avoided.

FIG. 20 illustrates a portion 1000-3 of a grease containment apparatus 1000 (as illustrated in FIGS. 15A-15B), showing a single straight trough or runner section 1030 suspended by a mounting bracket 1060 and connected to a corner trough assembly 1080 containing a drain assembly 800. Various elements of the straight trough or runner section 1030, mounting bracket 1060, corner trough section 10380, and drain assembly have been described previously herein.

FIG. 21A is a lower perspective view of the grease containment apparatus 1000 and rooftop grease exhauster 900 as illustrated in FIG. 15. The rooftop grease exhauster 900 includes a fan 902, a grease discharge line 907, and associated electrical conduit 908. Each corner trough section 1080 mates with two straight trough or runner sections 1030, and each corner trough has a lower fitting or cap 1010. In practice, the grease containment apparatus may include one or multiple drain assemblies as described previously herein. Where a drain assembly is provided, an associated a corner trough section 1080 containing such drain assembly preferably includes discharge piping joined to a fitting 1010. Where a drain assembly is not provided, an aperture defined in a bottom wall of a corner trough section 1080 may be closed with a cap 1010 that may be temporarily sealed (e.g., with a threaded connection) or permanently sealed (e.g., by solvent welding). FIG. 21B is a lower perspective view of the grease containment apparatus 1000 and rooftop grease exhauster 900 of FIG. 21A, further including optional support legs 1019. The support legs 1019 may fit around the illustrated fittings or caps 1010, with at least one support leg optionally defining a drain conduit. The support legs 1019 may be provided to supplement or to replace the mounting brackets 1060 illustrated in FIG. 19 to elevate the grease containment apparatus 1000 above roof material.

FIG. 22A is a perspective assembly view showing components of a portion 1000-4 of the grease containment apparatus 1000 illustrated in FIGS. 15A-15B and FIGS. 21A-21B. FIG. 22B is a perspective view of the portion of the grease containment apparatus portion illustrated in FIG. 22A, showing the illustrated components in an assembled state. The various components shown in FIGS. 22A-22B include a corner trough section 1080 (including optional registration hole 1073B for receiving a corresponding registration pin defined in a corner rain shield 1070), a straight trough or runner section 1030, a corner rain shield 1070, a mounting bracket 1060, and a flashing section 1050. The L-shaped corner rain shield (or corner cover) 1070 includes a horizontal wall portion 1071 and an angled wall portion 1072, with a registration pin 1073 optionally extending from a lower surface thereof for mating with the corner trough section 1080. The flashing section 1050 includes an upper edge 1051, a lower edge 1052, a vertically arranged first section 1053 extending from the upper edge 1051, a downwardly extending lower lip 1055 along the lower edge 1052, and an angled intermediate section 1054 extending between the first and third sections 1053, 1055. The flashing section 1050 is preferably formed from two portions that meet at a corner 1058, with an optional reinforcing plate 1057 joining the portions. The flashing section 1050 may be formed of any suitable metal or polymeric material. Multiple flashing sections may abut or overlap one another when mounted to a grease exhauster fan base. Each flashing section 1050 preferably extends over or across mounting brackets or hangers 1060 and is arranged to direct grease received from the rooftop grease exhauster into at least one (straight and/or corner) trough section.

Figure 23:
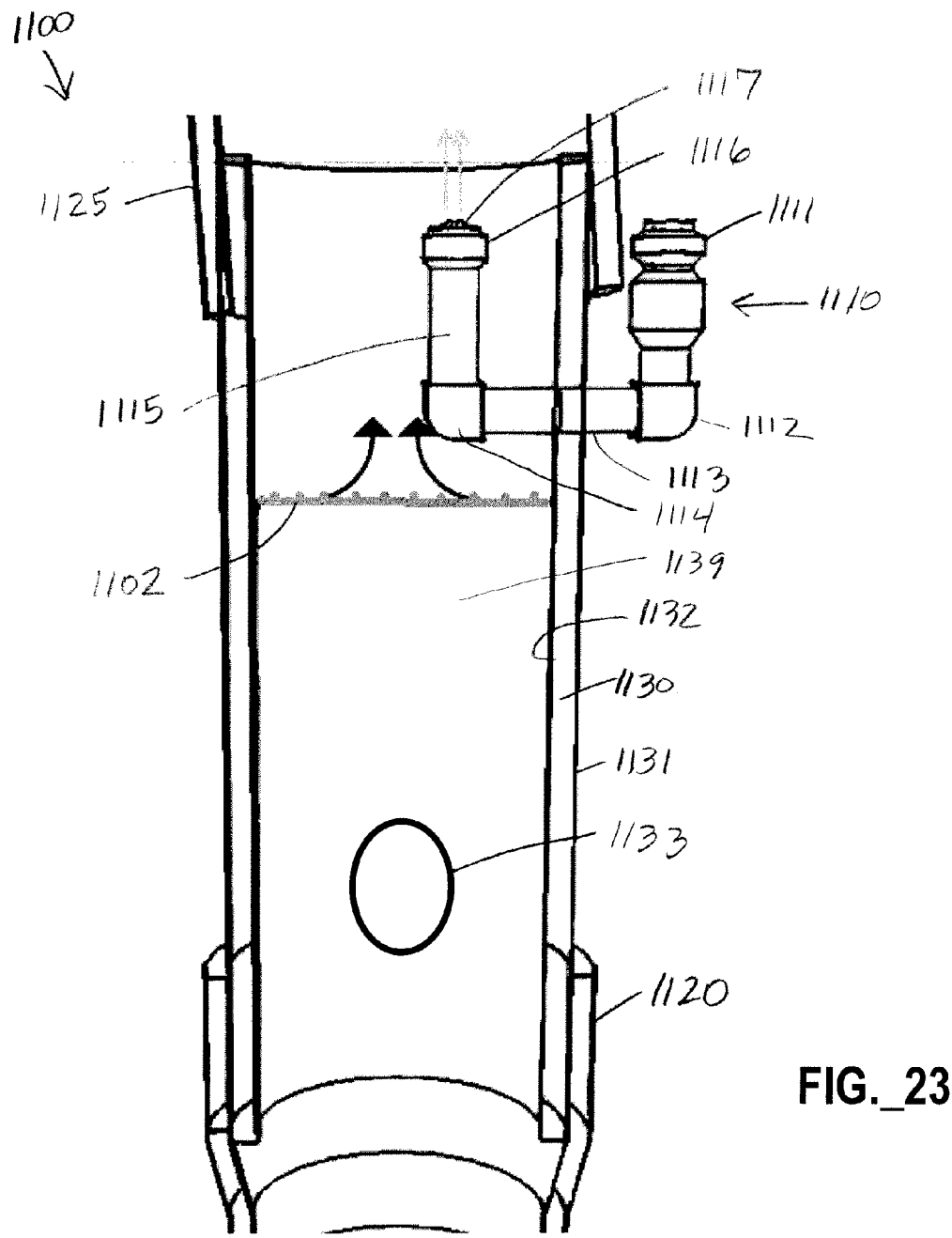
FIG. 23 is a simplified side cross-sectional view of a drain assembly including a venturi cleaning attachment or fitting permitting ingress of pressurized liquid to promote suction discharge of the contents of the drain assembly and any liquid-containing apparatus (e.g., corner trough section) connected thereto.

FIG. 23 is a simplified side cross-sectional view of a drain assembly 1100 including a venturi cleaning attachment or fitting 1111 permitting ingress of pressurized liquid to promote forced suction discharge of the contents of the drain assembly 1100 and any liquid-containing apparatus (e.g., corner trough section) connected thereto. The drain assembly 1100 includes an inner conduit 1131 (having an outer surface 1131 and an inner surface 1132) mated with a base conduit section 1120. An outlet conduit or tube (material removal conduit) 1125 may be fitted (whether on a temporary or permanent basis) over an upper end of the inner conduit 1131. A venturi cleaning attachment 1110 includes a fitting 1111 (e.g., quick disconnect fitting or threaded fitting) arranged to receiving pressurized fluid (e.g., pressurized water supplied by a pressure washer). The attachment includes elbows 1112, 1114 and an intermediate section extending through a wall of the inner conduit 1130 and leading to a discharge pipe 1115 having a cap 1116 with at least one aperture 1117 defined therein. If a lower end of the base conduit section 1120 is closed (e.g., capped), then the inner conduit 1130 may include an inlet opening 1133 permitting fluid to enter the bore 1139 thereof. When pressurized fluid (e.g., pressurized water) is supplied to the fitting 1111 and is exhausted out the at least one aperture 1117 of the discharge pipe 1115, such fluid flows rapidly into the outlet conduit or tube (shown by the topmost arrows), creating a region of low pressure behind the exhaust flow by the principle of a Venturi pump. Such low pressure region creates suction that draws liquid (i.e., as illustrated by liquid level 1102) within the bore upward into the outlet conduit or tube 1125. In this manner, material within the drain assembly 1100 (and by extension, a grease containment apparatus to which the drain assembly is joined) is removed by suction, thereby facilitating cleaning of a grease containment apparatus. In one embodiment, a liquid level sensor is arranged within the grease containment apparatus and/or drain assembly 1100, and removal of material from the grease containment apparatus by venturi pumping using the drain assembly 1100 is activated responsive to a signal generated by such sensor. In certain embodiments, a material removal conduit or tube arranged to receive material removed from the grease containment apparatus is arranged to return material to a hood stack associated with the rooftop grease exhauster.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A grease containment apparatus arranged to receive grease from a rooftop grease exhauster, the grease containment apparatus comprising:
    at least one trough section arranged to receive grease released from the rooftop grease exhauster; and
    a drain assembly arranged to drain fluid from the at least one trough section, the drain assembly comprising (a) an inner conduit disposed within an outer conduit, the outer conduit including an inlet opening, and the inner conduit including an inlet opening and an outlet opening, wherein the inlet opening of the inner conduit is disposed above the inlet opening of the outer conduit, and is further disposed below the upper end of the outer conduit; (b) a first flow passage extending between the inlet opening of the outer conduit and the inlet opening of the inner conduit; and (c) a second flow passage extending between the inlet opening of the inner conduit and the outlet opening of the inner conduit.

2. A grease containment apparatus according to claim 1, wherein each of the inner conduit and the outer conduit is oriented in an approximately vertical configuration.

3. A grease containment apparatus according to claim 1, wherein the first flow passage comprises a passage defined between an inner wall of the outer conduit and an outer wall of the inner conduit.

4. A grease containment apparatus according to claim 1, further comprising a base conduit section disposed below the outer conduit, wherein the inner conduit extends through the base conduit section, and wherein the inlet opening of the outer conduit is disposed between the base conduit section and the outer conduit.

5. A grease containment apparatus according to claim 1, being devoid of any grease absorbing medium.

6. A grease containment apparatus according to claim 1, further comprising at least one of
(i) a grease absorbing medium and (ii) a filtration screen, arranged for flow of liquid therethrough, and arranged upstream of or along the inlet opening of the outer conduit.

7. A grease containment apparatus according to claim 1, wherein the at least one trough section comprises multiple corner trough sections and at least one trough or runner section intermediately arranged between the multiple corner trough.

8. A grease containment apparatus according to claim 1, comprising four corner trough sections arranged to mate with trough or runner sections intermediately arranged between the four corner troughs, and arranged to surround four sides of a rooftop grease exhauster.

9. A grease containment apparatus according to claim 1, comprising flashing arranged to direct grease received from the rooftop grease exhauster into the at least one trough section.

10. A method comprising use of a grease containment apparatus according to claim 1 to automatically and preferentially drain water in comparison to grease from the grease containment apparatus.

11. A method according to claim 10, wherein the automatic and preferential draining of water in comparison to grease is motivated exclusively via gravity.

12. A grease containment apparatus arranged to receive grease from a rooftop grease exhauster, the grease containment apparatus comprising:
a plurality of trough sections including multiple corner trough sections and at least one trough or runner section intermediately arranged and sealingly engaged between the multiple corner trough sections, wherein the plurality of trough sections comprise polymeric materials;
a plurality of hangers joined to the rooftop grease exhauster or a support structure thereof, and arranged to support the plurality of trough sections in an elevated position relative to a roof surface, wherein each hanger comprises multiple bends to impart flexibility in supporting the plurality of trough sections; and
flashing extending over or across the plurality of hangers and arranged to direct grease received from the rooftop grease exhauster into the at least one trough section;
wherein the grease containment apparatus includes at least one of the following features (i) to (iv):
(i) at least one trough section comprises a drain aperture and a removable drain plug arranged to seal the drain aperture;
(ii) each trough section of the plurality of trough sections is devoid of grease absorbent material;
(iii) at least one trough section comprises a drain aperture and a drain conduit or drain assembly coupled to the drain aperture, and wherein at least a portion of a flow path defined by the drain conduit or drain assembly is elevated above a bottom wall of the at least one trough section; and
(iv) at least one trough section comprises a drain assembly arranged to drain fluid from the at least one trough section, the drain assembly comprising (a) an inner conduit disposed within an outer conduit, the outer conduit including an inlet opening, and the inner conduit including an inlet opening and an outlet opening, wherein the inlet opening of the inner conduit is disposed above the inlet opening of the outer conduit, and is further disposed below the upper end of the outer conduit; (b) a first flow passage extending between the inlet opening of the outer conduit and the inlet opening of the inner conduit; and (c) a second flow passage extending between the inlet opening of the inner conduit and the outlet opening of the inner conduit.

13. A grease containment apparatus according to claim 12, wherein each trough section has an associated rain shield arranged to inhibit ingress of rain water.

14. A grease containment apparatus according to claim 12, wherein at least one trough section comprises a drain aperture and a removable drain plug arranged to seal the drain aperture.

15. A grease containment apparatus according to claim 12, wherein each trough section of the plurality of trough sections is devoid of grease absorbent material.

16. A grease containment apparatus according to claim 12, wherein each trough section is sealed to at least one other trough section by solvent welding or adhesive bonding.

17. A grease containment apparatus according to claim 12, wherein at least one trough section comprises a drain aperture and a drain conduit or drain assembly coupled to the drain aperture, and wherein at least a portion of a flow path defined by the drain conduit or drain assembly is elevated above a bottom wall of the at least one trough section.

18. A grease containment apparatus according to claim 12, wherein at least one trough section comprises a drain assembly arranged to drain fluid from the at least one trough section, the drain assembly comprising (a) an inner conduit disposed within an outer conduit, the outer conduit including an inlet opening, and the inner conduit including an inlet opening and an outlet opening, wherein the inlet opening of the inner conduit is disposed above the inlet opening of the outer conduit, and is further disposed below the upper end of the outer conduit; (b) a first flow passage extending between the inlet opening of the outer conduit and the inlet opening of the inner conduit; and (c) a second flow passage extending between the inlet opening of the inner conduit and the outlet opening of the inner conduit.

19. A grease containment apparatus arranged to receive grease from a rooftop grease exhauster, the grease containment apparatus comprising:
at least one trough section arranged to receive grease released from the rooftop grease exhauster; and
a venturi cleaning attachment arranged to receive pressurized fluid and promote transfer of material from the at least one trough section into a material removal conduit.

20. A grease containment apparatus according to claim 19, adapted to receive pressurized fluid from a pressure washer.

21. A grease containment apparatus according to claim 19, wherein the material removal conduit is arranged to return material to a hood stack associated with the rooftop grease exhauster.

* * * * *